United States Patent [19]
Kumagae et al.

[11] Patent Number: 6,093,832
[45] Date of Patent: Jul. 25, 2000

[54] DIIMINOISOINDOLINE COMPOUND AND THE PROCESS FOR PRODUCING THE COMPOUND AND USE THEREOF

[75] Inventors: Yojiro Kumagae; Toshihiro Masaoka; Shigeo Fujita; Tsunehito Eda, all of Osaka, Japan

[73] Assignees: Yamamoto Chemicals, Inc., Osaka; Mitsui Chemicals, Inc., Tokyo, both of Japan

[21] Appl. No.: 09/277,610

[22] Filed: Mar. 29, 1999

Related U.S. Application Data

[62] Division of application No. 09/221,152, Dec. 28, 1998, Pat. No. 5,973,140.

[30] Foreign Application Priority Data

Dec. 29, 1997 [JP] Japan ..................................... 9-367861

[51] Int. Cl.$^7$ ............................................. C07D 209/44
[52] U.S. Cl. ........................................... 548/470; 548/482
[58] Field of Search ...................... 548/470, 482

[56] References Cited

U.S. PATENT DOCUMENTS

| | | | |
|---|---|---|---|
| 5,750,229 | 5/1998 | Oguchi et al. | 428/64.1 |
| 5,783,694 | 7/1998 | Hagen | 540/123 |
| 5,973,140 | 10/1999 | Kumagae et al. | 540/125 |

FOREIGN PATENT DOCUMENTS 6-287462  11/1994  Japan .

*Primary Examiner*—Mukund J. Shah
*Assistant Examiner*—Pavanaram K Sripada
*Attorney, Agent, or Firm*—Birch, Stewart, Kolasch & Birch, LLP

[57] ABSTRACT

The invention relates to novel phthalocyanine compounds, their intermediates and a process for their preparation. The inventive phthalocyanine compound absorbs in the near infrared region of the spectrum with a high absorption coefficient which features high solubility in solvents, good compatibility with resins and high aging resistance, thus finding application as a near infrared ray absorbing material or a light-heat conversion material with great advantage and to a process for producing the phthalocyanine compound. The novel phthalocyanine compound has the following general formula:

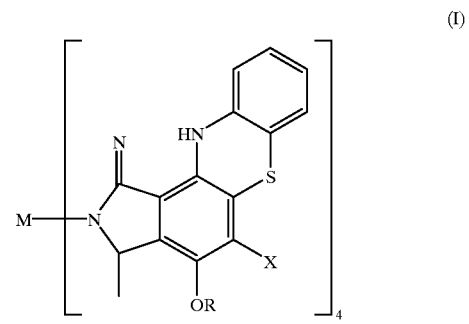

(I)

wherein R represents alkyl or alkoxyalkyl; X represents halogen, alkylthio, phenylthio which may be substituted, or naphthylthio which may be substituted; M represents a couple of hydrogen atoms, a divalent metal, or a trivalent or tetravalent metal derivative. The near infrared ray absorbing and light-heat conversion materials containing the above phthalocyanine compound are also described.

17 Claims, 19 Drawing Sheets

DIIMINOISOINDOLINE COMPOUND AND THE PROCESS FOR PRODUCING THE COMPOUND AND USE THEREOF

This application is a Div of 09/221,152 filed Dec. 25, 1998 U.S. Pat. 5,973,140.

FIELD OF THE INVENTION

The present invention relates to novel phthalocyanine compounds and more particularly to novel phthalocyanine compounds absorbing in the near infrared region, i.e. 800–1200 nm, of the spectrum and readily soluble in organic solvents, thus finding application in various uses such as optical cards, organic photoconductors, near infrared ray-absorbing filters, thermal ray-shielding film, protective goggles, laser direct platemaking so-called computer-to-plate (CTP), laser thermal transfer printing, and laser thermal recording and to a process for producing them.

BRIEF DESCRIPTION OF THE RELATED ART

Among phthalocyanine compounds, there are some which absorb near infrared rays with high efficiency and there has been a mounting interest of late in the application of such compounds to optical cards, near infrared ray-absorbing filters, thermal ray-shielding films, protective goggles, laser direct platemaking, laser thermal transfer printing, laser thermal recording, and organic photoconductors for laser printer use, among other applications.

As one of such phthalocyanine compounds, Kokai Tokkyo Koho (Japanese laid-open patent application) H8-176101 laying open the invention previously made by the inventors of the present invention describes a phthalocyanine compound which is available upon reacting a phthalonitrile compound having alkoxy groups in the 3- and 6-positions and an 2-aminophenylthio group in the 4-position with a metal or a metal derivative. However, when the above-mentioned phthalonitrile was thus used as a synthetic intermediate, the resultant phthalocyanine compound was not fully satisfactory in the performance parameters of absorption efficiency and absorbing wavelength. The reason is suspected to be that the phthalocyanine compound thus obtained was actually a mixture of phthalocyanine compounds varying in the positions and numbers of substituent groups and phthalocyanine polymers.

Particularly for use as near infrared ray absorbing materials or light-heat conversion materials in such applications as thermal ray-shielding films, plasma display near infrared ray absorbing filters, laser direct platemaking, laser thermal transfer printing, and laser heat-sensitive recording, phthalocyanine compounds which would absorb on the longer wavelength side than the conventional phthalocyanine compounds with high absorption coefficients have been demanded.

OBJECT AND SUMMARY OF THE INVENTION

The object of the present invention is to provide a novel phthalocyanine compound which absorbs in the spectral wavelength region of 800–1200 nm and is of value as a near infrared ray absorbing material excelling in the above-mentioned performance parameters, a novel intermediate for its synthesis, and a process for producing said compound.

Intensive investigations for accomplishing the above object led the present inventors to the discovery that a phthalocyanine compound having a high-intensity absorption band over the range of 800–1200 nm and showing high solubility in organic solvents can be obtained by the route of synthesis via a certain intermediate from a phthalonitrile compound.

The present invention is first directed to a phthalocyanine compound of the following general formula (I) and to a near infrared ray absorbing material and a light-heat conversion material, both of which contain said phthalocyanine compound.

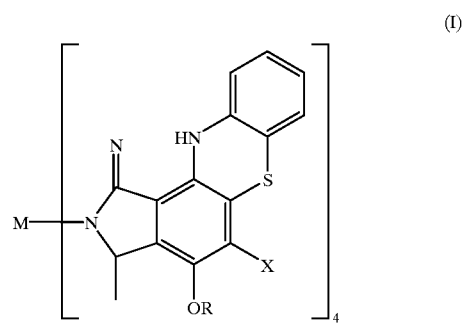

wherein R represents alkyl or alkoxyalkyl; X represents halogen, alkylthio, phenylthio which maybe substituted, or naphthylthio which may be substituted; M represents a couple of hydrogen atoms, a divalent metal, or a trivalent or tetravalent metal derivative.

The present invention is further directed to a near infrared ray absorbing material and a light-heat conversion material, both of which contain at least one member selected from the following phthalocyanine compounds of general formulas (II)–(V).

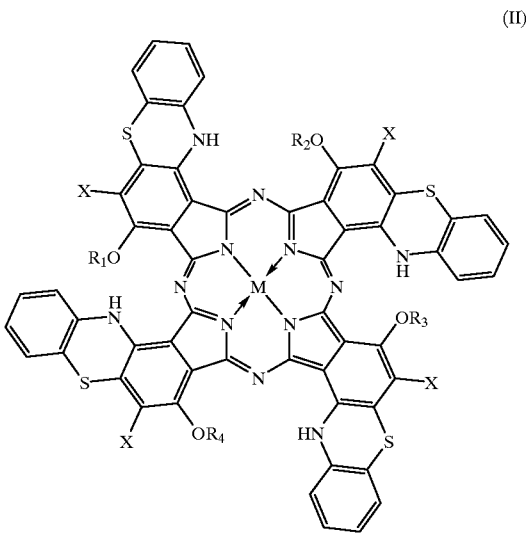

-continued (III)

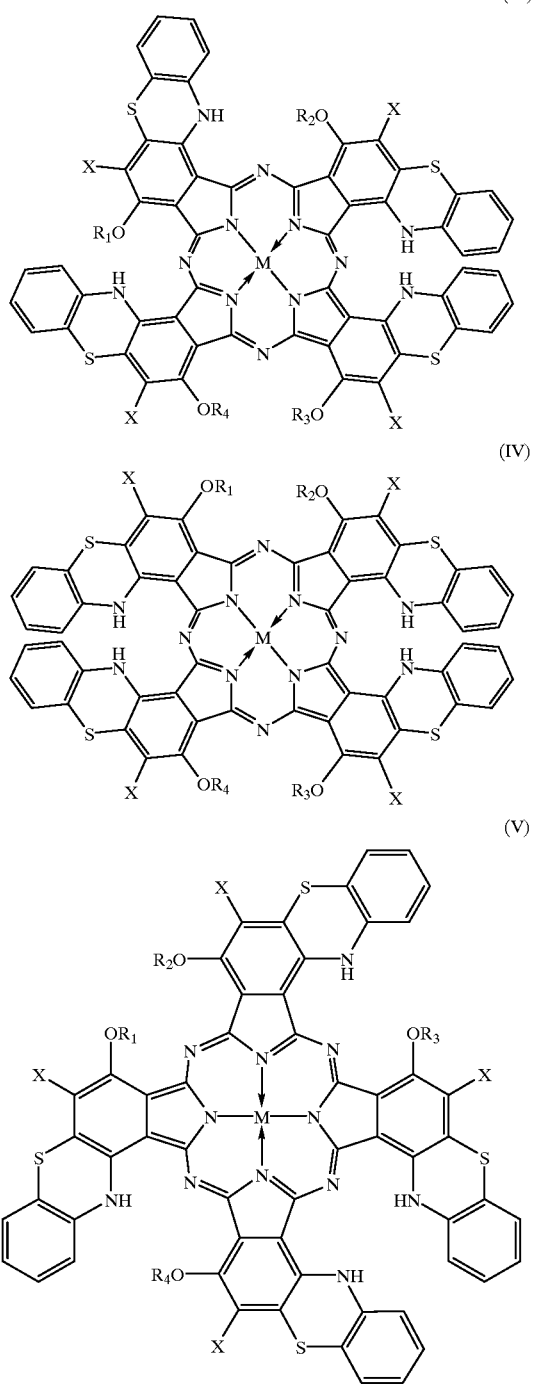

(IV)

(V)

wherein $R_1$–$R_4$ each independently represents alkyl or alkoxyalkyl; X represents halogen, alkylthio, phenylthio which may be substituted, or naphthylthio which may be substituted; M represents a couple of hydrogen atoms, a divalent metal, or a trivalent or tetravalent metal derivative.

The present invention is further directed to a process for producing a phthalocyanine compound of general formula (I) or any of formulas (II)–(V) which comprises reacting a diiminoisoindoline compound of general formula (VI) with a metal or a metal derivative.

(VI)

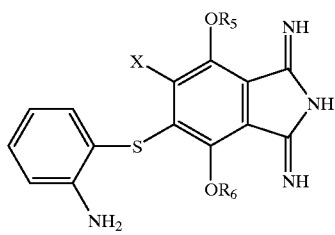

wherein $R_5$ and $R_6$ each represents alkyl or alkoxyalkyl; X represents halogen, alkylthio, phenylthio which may be substituted, or naphthylthio which may be substituted.

The present invention is further directed to a diiminoisoindoline compound of the above general formula (VI) and to a process for producing the same.

DETAILED DESCRIPTION OF THE INVENTION

Phthalocyanine Compound

Figure 1:
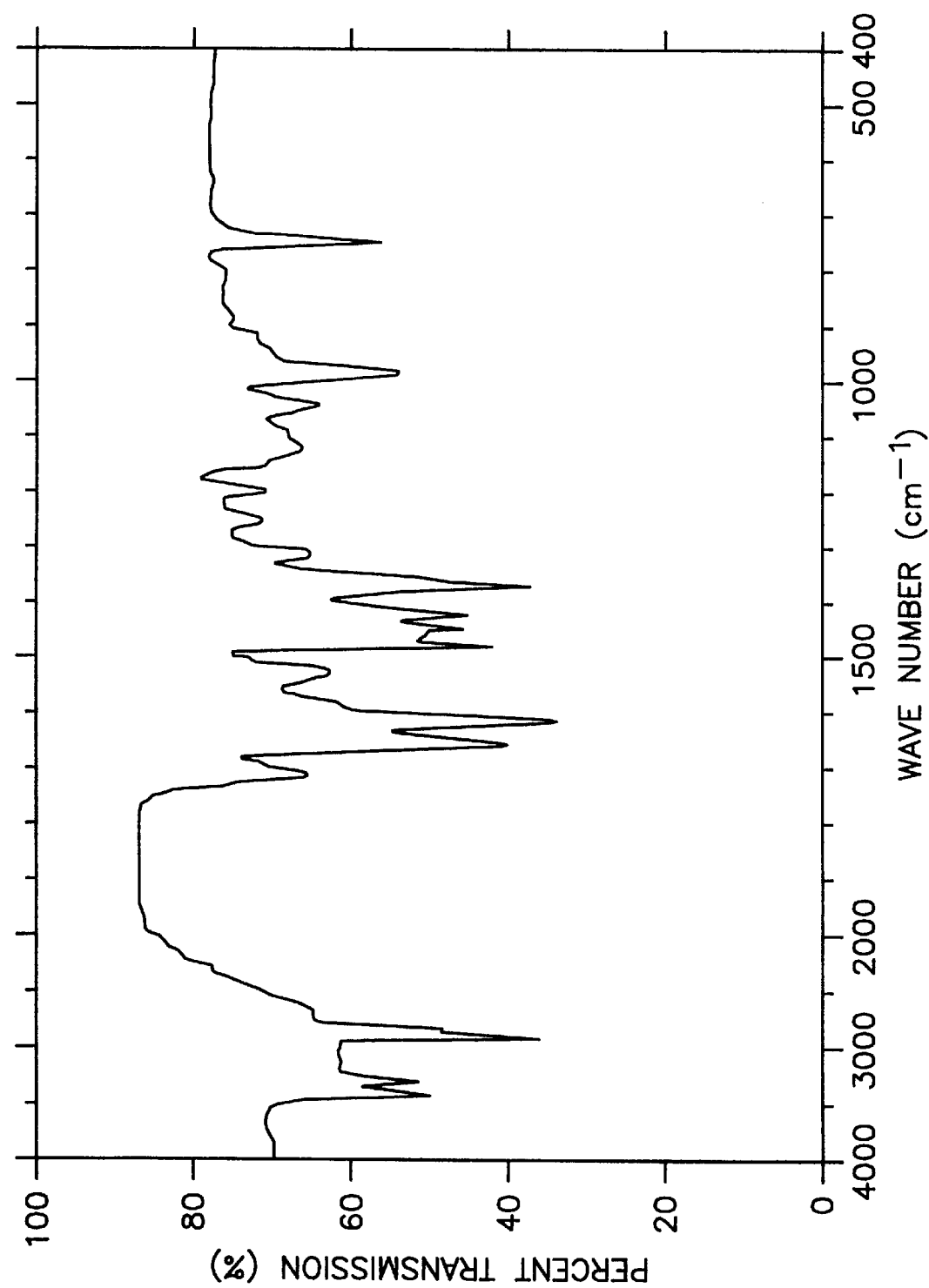
FIG. 1 shows an infrared absorption spectrum of 5-(2-aminophenylthio)-6-chloro-1,3-diimino-4,7-diisopentoxyisoindoline as synthesized in Example 1.

The subject matter of the invention is a phthalocyanine compound of the following general formula (I) or any of the following general formulas (II)–(V) (hereinafter referred to collectively as the phthalocyanine compound of the invention).

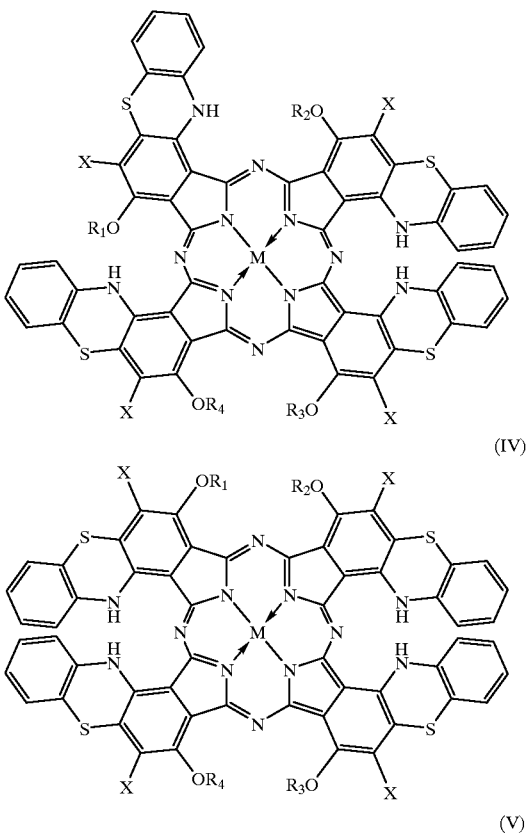

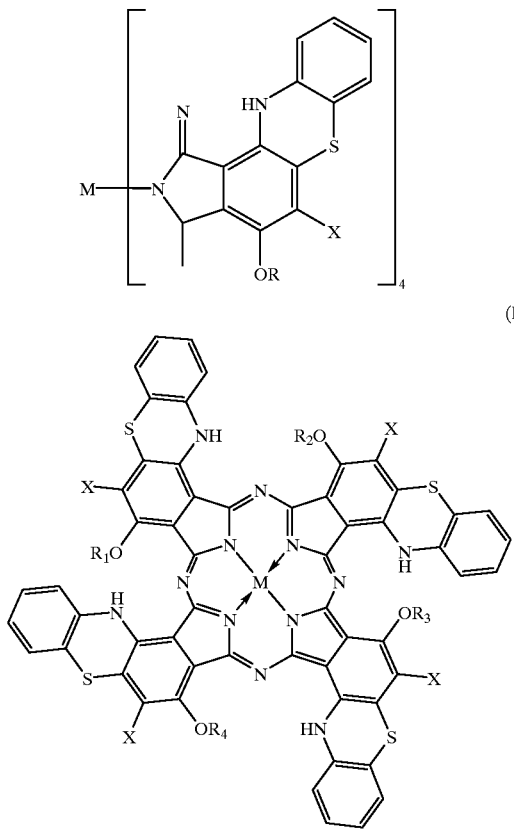

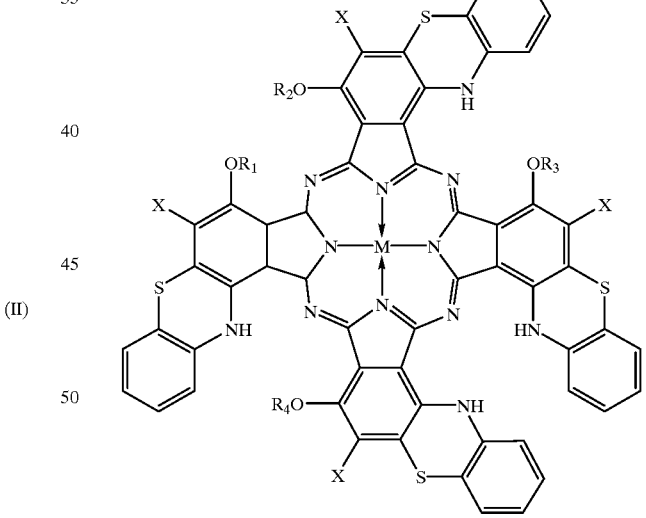

In the above general formulas, R, $R_1$–$R_4$, X, and M are respectively as defined hereinbefore.

Referring to the phthalocyanine compound of the invention, the alkyl mentioned for R or $R_1$–$R_4$ is preferably a straight-chain or branched alkyl group containing 1–12 carbon atoms, more preferably a straight-chain or branched alkyl group of 1–8 carbon atoms. Thus, methyl, ethyl, n-propyl, isopropyl, n-butyl, isobutyl, sec-butyl, n-pentyl, isopentyl, neopentyl, n-heptyl, isoheptyl, sec-heptyl, n-octyl, and 2-ethylhexyl can be mentioned by way of illustration.

The alkoxyalkyl mentioned for R or $R_1$–$R_4$ is preferably a group containing a total of 2–8 carbon atoms, particularly 3–6 carbon atoms. Thus, for example, methoxyethyl, methoxypropyl, methoxybutyl, ethoxyethyl, ethoxypropyl, ethoxybutyl, n-propoxyethyl, and iso-propoxyethyl can be mentioned.

X represents halogen, alkylthio, phenylthio which may be substituted, or naphthylthio which may be substituted. The halogen mentioned for X is preferably chlorine, bromine, or fluorine, particularly chlorine.

The alkylthio mentioned for X is preferably an alkylthio group containing 1–12 carbon atoms, particularly an alkylthio group of 1–8 carbon atoms. Thus, methylthio, ethylthio, n-propylthio, isopropylthio, n-butylthio, sec-butylthio, tert-butylthio, n-pentylthio, isopentylthio, neopentylthio, n-hexylthio, isohexylthio, sec-hexylthio, cyclohexylthio, n-heptylthio, isoheptylthio, sec-heptylthio, n-octylthio, 2-ethylhexylthio, n-nonylthio, n-decylthio, n-undecylthio, and n-dodecylthio can be mentioned by way of illustration.

Where X represents a substituted or unsubstituted phenylthio group, the preferred substituent includes alkyl of 1–8 carbon atoms, alkoxy of 1–8 carbon atoms, amino substituted by alkyl, and halogen. Specifically, the phenylthio substituted by such substituent group or groups includes but is not limited to phenylthio, p-methylphenylthio, p-ethylphenylthio, p-n-butyl-phenylthio, p-n-propylphenylthio, p-tert-butyl-phenylthio, p-n-octylphenylthio, p-methoxyphenylthio, p-ethoxyphenylthio, p-n-propoxyphenylthio, p-isopropoxyphenylthio, p-n-butoxyphenylthio, p-isobutoxyphenylthio, p-sec-butoxyphenylthio, p-n-pentoxyphenylthio, p-n-octylphenylthio, 2,4-dimethylphenylthio, p-dimethylaminophenylthio, p-diethylaminophenylthio, p-di-n-butylaminophenylthio, p-chlorophenylthio, p-bromophenylthio, p-fluorophenylthio, and 2,4-dichlorophenylthio. Particularly preferred are phenylthio and phenylthio substituted by $C_{1-8}$ alkyl, $C_{1-8}$ alkoxy, $C_{1-8}$ (total)dialkylamino, or halogen.

Where X represents naphthylthio which may be substituted, the substituent is preferably $C_{1-4}$ alkyl or halogen. The naphthylthio as such includes but is not limited to naphthylthio, methylnaphthylthio, n-propylnaphthylthio, iso-propylnaphthylthio, n-butylnaphthylthio, tert-butylnaphthylthio, chloronaphthylthio, bromonaphthylthio, and fluoronaphthylthio. Particularly preferred are naphthylthio and $C_{1-4}$ alkyl-substituted naphthylthio.

The divalent metal for M includes such preferred species as Cu, Zn, Fe, Co, Ni, Ru, Pb, Rh, Pd, Pt, Mn, Sn, and Pb. The trivalent or tetravalent metal derivative for M includes such preferred species as AlCl, InCl, FeCl, MnOH, $SiCl_2$, $SnCl_2$, $GeCl_2$, $Si(OH)_2$, $Sn(OH)_2$, $Ge(OH)_2$, VO, and TiO. Particularly preferred examples of M are Cu, Ni, Co, FeCl, Zn, VO, Pd, and MnOH.

The phthalocyanine compound of the invention includes compounds of the following general formulas (II)–(V) but the compound of general formula (II) is most ready to form due to the steric hindrance of substituent groups.

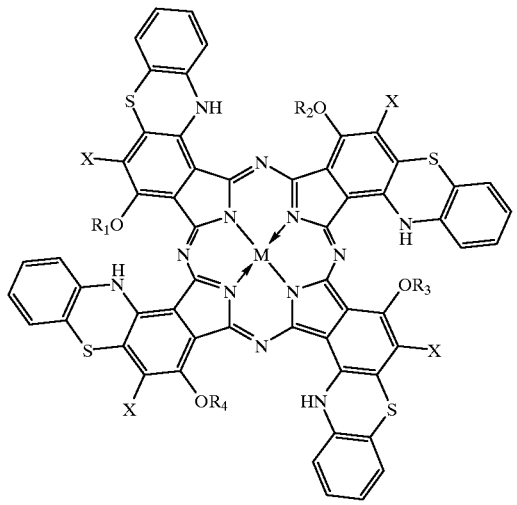

(II)

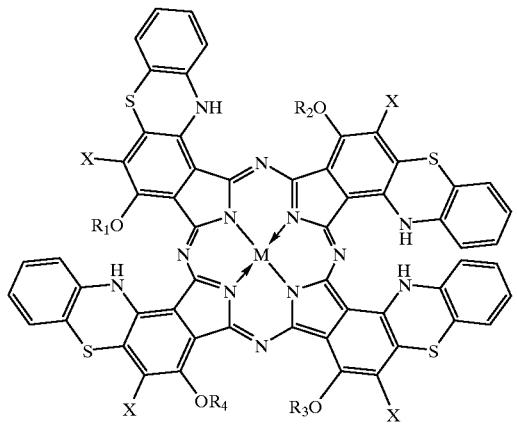

(III)

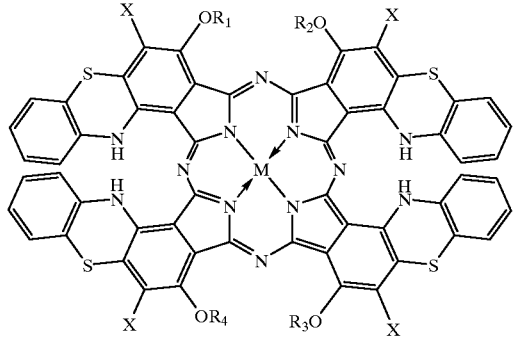

(IV)

-continued

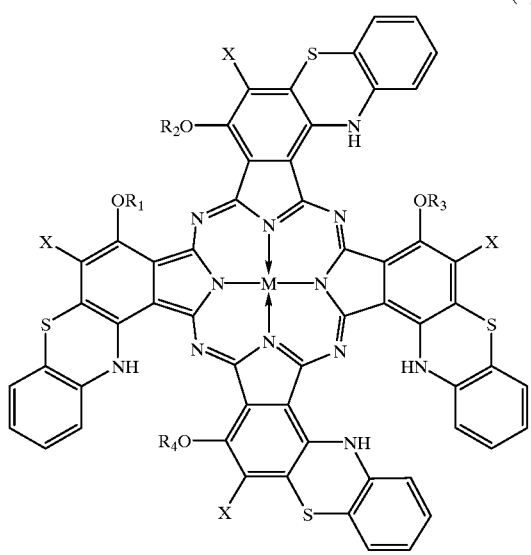

(V)

Referring to the substituent groups $R_1$–$R_4$ of the phthalocyanine compounds of general formulas (II)–(V), those compounds in which all of $R_1$–$R_4$ represent one and the same substituent group are particularly preferred.

Specific examples of the phthalocyanine compound of general formula (I) or the phthalocyanine compounds of general formulas (II)–(V) are presented below in Table 1.

TABLE 1

| | M | R ($R_1$~$R_4$) | X |
|---|---|---|---|
| Compound I-(1) | VO | $CH_3$ | Cl |
| Compound I-(2) | Cu | $CH_3$ | Br |
| Compound I-(3) | Ni | $CH_3$ | S-n-$C_8H_{17}$ |
| Compound I-(4) | Co | $CH_3$ | S-n-$C_{11}H_{23}$ |
| Compound I-(5) | Zn | $C_2H_5$ | Cl |
| Compound I-(6) | VO | $C_2H_5$ | F |
| Compound I-(7) | VO | $C_2H_5$ | S-n-$C_9H_{19}$ |
| Compound I-(8) | In | $C_2H_5$ | S-n-$C_{12}H_{25}$ |
| Compound I-(9) | MnOH | $C_2H_5$ | 4-n-butoxy-phenylthio |
| Compound I-(10) | Pd | n-$C_3H_7$ | Cl |
| Compound I-(11) | AlCl | n-$C_3H_7$ | S-sec-$C_7H_{15}$ |
| Compound I-(12) | VO | n-$C_3H_7$ | 4-n-butylphenyl-thio |
| Compound I-(13) | Cu | iso-$C_3H_7$ | Cl |
| Compound I-(14) | Pb | iso-$C_3H_7$ | S-n-$C_5H_{11}$ |
| Compound I-(15) | Ni | n-$C_4H_9$ | Cl |
| Compound I-(16) | Ru | n-$C_4H_9$ | 4-di-n-butyl-aminophenylthio |
| Compound I-(17) | Ni | n-$C_4H_9$ | cyclohexylthio |
| Compound I-(18) | MnOH | sec-$C_4H_9$ | Cl |
| Compound I-(19) | VO | sec-$C_4H_9$ | ↑ |
| Compound I-(20) | SnCl | sec-$C_4H_9$ | F |
| Compound I-(21) | VO | sec-$C_4H_9$ | Br |
| Compound I-(22) | Cu | sec-$C_4H_9$ | phenylthio |
| Compound I-(23) | Zn | iso-$C_4H_9$ | Cl |
| Compound I-(24) | Co | iso-$C_4H_9$ | 4-tert-butyl-phenylthio |
| Compound I-(25) | FeCl | iso-$C_4H_9$ | Br |
| Compound I-(26) | VO | n-$C_5H_{11}$ | Cl |
| Compound I-(27) | Cu | n-$C_5H_{11}$ | F |
| Compound I-(28) | AlCl | n-$C_5H_{11}$ | 4-chlorophenyl-thio |
| Compound I-(29) | FeCl | n-$C_5H_{11}$ | $SCH_3$ |
| Compound I-(30) | Pd | n-$C_5H_{11}$ | Cl |
| Compound I-(31) | VO | iso-$C_5H_{11}$ | ↑ |
| Compound I-(32) | Cu | iso-$C_5H_{11}$ | ↑ |
| Compound I-(33) | InCl | iso-$C_5H_{11}$ | ↑ |
| Compound I-(34) | Zn | iso-$C_5H_{11}$ | ↑ |
| Compound I-(35) | InCl | iso-$C_5H_{11}$ | Br |
| Compound I-(36) | Zn | iso-$C_5H_{11}$ | F |
| Compound I-(37) | Pb | iso-$C_5H_{11}$ | $SC_2H_5$ |
| Compound I-(38) | InCl | iso-$C_5H_{11}$ | S-iso-$C_3H_7$ |
| Compound I-(39) | Ru | iso-$C_5H_{11}$ | 4-methoxyphenyl- |

TABLE 1-continued

|  | M | R ($R_1$~$R_4$) | X |
|---|---|---|---|
| Compound I-(40) | Ni | iso-$C_5H_{11}$ | thio naphthylthio |
| Compound I-(41) | Co | iso-$C_5H_{11}$ | 4-dimethylamino-phenylthio |
| Compound I-(42) | Zn | iso-$C_5H_{11}$ | 4-ethoxyphenyl-thio |
| Compound I-(43) | FeCl | iso-$C_5H_{11}$ | 4-bromophenyl-thio |
| Compound I-(44) | AlCl | iso-$C_5H_{11}$ | 2,4-dichloro-phenylthio |
| Compound I-(45) | SnCl | iso-$C_5H_{11}$ | S-n-$C_4H_9$ |
| Compound I-(46) | TiO | sec-$C_5H_{11}$ | Cl |
| Compound I-(47) | Pd | sec-$C_5H_{11}$ | S-n-$C_2H_5$ |
| Compound I-(48) | MnOH | neo-$C_5H_{11}$ | Cl |
| Compound I-(49) | VO | n-$C_6H_{13}$ | ↑ |
| Compound I-(50) | Ni | n-$C_6H_{13}$ | S-n-$C_3H_7$ |
| Compound I-(51) | Co | n-$C_6H_{13}$ | Br |
| Compound I-(52) | TiO | n-$C_6H_{13}$ | ↑ |
| Compound I-(53) | VO | n-$C_6H_{13}$ | F |
| Compound I-(54) | Cu | n-$C_6H_{13}$ | ↑ |
| Compound I-(55) | Zn | n-$C_6H_{13}$ | S-neo-$C_5H_{11}$ |
| Compound I-(56) | Pd | n-$C_6H_{13}$ | S-sec-$C_4H_9$ |
| Compound I-(57) | VO | iso-$C_6H_{13}$ | Cl |
| Compound I-(58) | Zn | iso-$C_6H_{13}$ | ↑ |
| Compound I-(59) | Cu | iso-$C_6H_{13}$ | S-iso-$C_3H_7$ |
| Compound I-(60) | Cu | iso-$C_6H_{13}$ | Br |
| Compound I-(61) | Ru | iso-$C_6H_{13}$ | F |
| Compound I-(62) | VO | iso-$C_6H_{13}$ | 4-methylphenyl-thio |
| Compound I-(63) | Pb | n-$C_7H_{14}$ | Cl |
| Compound I-(64) | Pd | n-$C_7H_{14}$ | ↑ |
| Compound I-(65) | AlCl | n-$C_7H_{14}$ | ↑ |
| Compound I-(66) | SnCl | n-$C_7H_{14}$ | 2,4-dimethyl-phenylthio |
| Compound I-(67) | VO | iso-$C_7H_{14}$ | Cl |
| Compound I-(68) | TiO | iso-$C_7H_{14}$ | ↑ |
| Compound I-(69) | FeCl | iso-$C_7H_{14}$ | Cl |
| Compound I-(70) | TiO | iso-$C_7H_{14}$ | S-n-$C_5H_{11}$ |
| Compound I-(71) | FeCl | iso-$C_7H_{14}$ | F |
| Compound I-(72) | Zn | iso-$C_7H_{14}$ | Br |
| Compound I-(73) | InCl | iso-$C_7H_{14}$ | 4-dimethylamino-phenylthio |
| Compound I-(74) | Cu | n-$C_8H_{17}$ | Cl |
| Compound I-(75) | SnCl | n-$C_8H_{17}$ | ↑ |
| Compound I-(76) | VO | n-$C_8H_{17}$ | F |
| Compound I-(77) | Cu | n-$C_8H_{17}$ | Br |
| Compound I-(78) | Ni | n-$C_8H_{17}$ | 4-fluorophenyl-thio |
| Compound I-(79) | Pd | n-$C_8H_{17}$ | $SCH_3$ |
| Compound I-(80) | VO | $CH_3(CH_2)_3CH(C_2H_5)CH_2$ | Cl |
| Compound I-(81) | Cu | $CH_3(CH_2)_3CH(C_2H_5)CH_2$ | ↑ |
| Compound I-(82) | MnOH | $CH_3(CH_2)_3CH(C_2H_5)CH_2$ | ↑ |
| Compound I-(83) | Ni | n-$C_9H_{19}$ | ↑ |
| Compound I-(84) | Co | n-$C_9H_{19}$ | S-iso-$C_5H_{11}$ |
| Compound I-(85) | InCl | n-$C_{12}H_{25}$ | Cl |
| Compound I-(86) | SnCl | n-$C_{12}H_{25}$ | F |
| Compound I-(87) | VO | $CH_3OC_2H_4$ | Cl |
| Compound I-(88) | Cu | $CH_3OC_2H_4$ | S-n-$C_6H_{13}$ |
| Compound I-(89) | Zn | $CH_3OC_2H_4$ | S-iso-$C_6H_{13}$ |
| Compound I-(90) | InCl | $C_2H_5OC_2H_4$ | S-sec-$C_6H_{13}$ |
| Compound I-(91) | TiO | $C_2H_5OC_2H_4$ | Cl |
| Compound I-(92) | Pb | n-$C_3H_7OC_2H_4$ | Br |
| Compound I-(93) | Ru | n-$C_3H_7OC_2H_4$ | Cl |
| Compound I-(94) | VO | iso-$C_3H_7OC_2H_4$ | S-n-$C_7H_{15}$ |
| Compound I-(95) | Cu | iso-$C_3H_7OC_2H_4$ | $SCH_2(C_2H_5)(CH_2)_3CH_3$ |
| Compound I-(96) | Ni | iso-$C_3H_7OC_2H_4$ | Cl |
| Compound I-(97) | Co | $C_2H_5OC_3H_6$ | ↑ |
| Compound I-(98) | Pd | $C_2H_5OC_3H_6$ | Br |
| Compound I-(99) | Zn | $C_2H_5OC_3H_6$ | Cl |
| Compound I-(100) | SnCl | $C_2H_5OC_4H_8$ | 4-ethylphenyl-thio |
| Compound I-(101) | Co | $C_2H_5OC_4H_8$ | 4-n-propyl-phenylthio |
| Compound I-(102) | VO | $C_2H_5OC_4H_8$ | Cl |
| Compound I-(103) | Cu | $C_2H_5OC_4H_8$ | F |
| Compound I-(104) | MnOH | $CH_3$ | Cl |
| Compound I-(105) | ↑ | $CH_3$ | S—$C_4H_9$ |

TABLE 1-continued

|  | M | R ($R_1$~$R_4$) | X |
|---|---|---|---|
| Compound I-(106) | ↑ | $C_2H_5$ | Cl |
| Compound I-(107) | ↑ | $C_2H_5$ | S-n-$C_8H_{17}$ |
| Compound I-(108) | ↑ | n-$C_3H_7$ | 4-n-butylphenyl-thio |
| Compound I-(109) | ↑ | n-$C_3H_7$ | Br |
| Compound I-(110) | ↑ | n-$C_4H_9$ | Cl |
| Compound I-(111) | ↑ | iso-$C_4H_9$ | cyclohexylthio |
| Compound I-(112) | ↑ | iso-$C_5H_{11}$ | Cl |
| Compound I-(113) | ↑ | iso-$C_5H_{11}$ | 4-tert-butyl-phenylthio |
| Compound I (114) | ↑ | n-$C_6H_{13}$ | Cl |
| Compound I-(115) | ↑ | iso-$C_6H_{13}$ | 4-methylphenyl-thio |
| Compound I-(116) | ↑ | n-$C_7H_{14}$ | F |
| Compound I-(117) | ↑ | iso-$C_7H_{14}$ | 4-chlorophenyl-thio |
| Compound I-(118) | ↑ | n-$C_8H_{17}$ | $SCH_3$ |
| Compound I-(119) | ↑ | n-$C_9H_{19}$ | Cl |
| Compound I-(120) | ↑ | n-$C_{12}H_{25}$ | ↑ |
| Compound I-(121) | ↑ | $CH_3OC_2H_4$ | ↑ |
| Compound I-(122) | ↑ | $C_2H_4OC_2H_5$ | S-ethylphenyl-thio |
| Compound I-(123) | ↑ | $C_2H_5OC_3H_6$ | Cl |
| Compound I-(124) | ↑ | $C_2H_5OC_4H_8$ | S-n-$C_6H_{13}$ |
| Compound I-(125) | Ni | $CH_3$ | Cl |
| Compound I-(126) | ↑ | $C_2H_5$ | ↑ |
| Compound I-(127) | ↑ | n-$C_3H_7$ | ↑ |
| Compound I-(128) | ↑ | iso-$C_3H_7$ | S-n-$C_5H_{11}$ |
| Compound I-(129) | ↑ | iso-$C_4H_9$ | Cl |
| Compound I-(130) | ↑ | n-$C_5H_{11}$ | F |
| Compound I-(131) | ↑ | iso-$C_5H_{11}$ | 2,4-dichloro-phenylthio |
| Compound I-(132) | ↑ | iso-$C_5H_{11}$ | 4-tert-butyl-phenylthio |
| Compound I-(133) | ↑ | n-$C_6H_{13}$ | Cl |
| Compound I-(134) | ↑ | iso-$C_6H_{13}$ | ↑ |
| Compound I-(135) | ↑ | n-$C_7H_{14}$ | ↑ |
| Compound I-(136) | ↑ | iso-$C_7H_{14}$ | S-iso-$C_6H_{13}$ |
| Compound I-(137) | ↑ | n-$C_8H_{17}$ | Cl |
| Compound I-(138) | ↑ | n-$C_9H_{19}$ | S-iso-$C_6H_{13}$ |
| Compound I-(139) | ↑ | n-$C_{12}H_{25}$ | Cl |
| Compound I-(140) | ↑ | $CH_3OC_2H_4$ | ↑ |
| Compound I-(141) | Ni | $C_2H_4OC_2H_5$ | ↑ |
| Compound I-(142) | ↑ | n-$C_3H_7OC_2H_4$ | ↑ |
| Compound I-(143) | ↑ | $C_2H_5OC_3H_6$ | ↑ |
| Compound I-(144) | ↑ | $C_2H_5OC_4H_8$ | 4-ethylphenyl-thio |
| Compound I-(145) | VO | $CH_3$ | S-n-$C_5H_{11}$ |
| Compound I-(146) | ↑ | $C_2H_5$ | 4-n-butylphenyl-thio |
| Compound I-(147) | ↑ | n-$C_3H_7$ | Cl |
| Compound I-(148) | ↑ | iso-$C_3H_7$ | ↑ |
| Compound I-(149) | ↑ | n-$C_4H_9$ | ↑ |
| Compound I-(150) | ↑ | sec-$C_4H_9$ | ↑ |
| Compound I-(151) | ↑ | n-$C_5H_{11}$ | 4-methoxyphenyl-thio |
| Compound I-(152) | ↑ | iso-$C_5H_{11}$ | 4-tert-butyl-phenylthio |
| Compound I-(153) | ↑ | sec-$C_5H_{11}$ | Cl |
| Compound I-(154) | ↑ | neo-$C_5H_{11}$ | ↑ |
| Compound I-(155) | ↑ | n-$C_6H_{13}$ | 4-dimethylamino-phenylthio |
| Compound I-(156) | ↑ | iso-$C_6H_{13}$ | S-neo-$C_5H_{11}$ |
| Compound I-(157) | ↑ | n-$C_7H_{14}$ | Cl |
| Compound I-(156) | ↑ | iso-$C_6H_{13}$ | S-neo-$C_5H_{11}$ |
| Compound I-(157) | ↑ | n-$C_7H_{14}$ | Cl |
| Compound I-(158) | ↑ | iso-$C_7H_{14}$ | 4-methylphenyl-thio |

TABLE 1-continued

| | M | R ($R_1$~$R_4$) | X |
|---|---|---|---|
| Compound I-(159) | ↑ | n-$C_8H_{17}$ | Cl |
| Compound I-(160) | ↑ | $CH_3(CH_2)_3CH(C_2H_5)CH_2$ | S-n-$C_5H_{11}$ |
| Compound I-(161) | ↑ | n-$C_9H_{19}$ | Cl |
| Compound I-(162) | ↑ | n-$C_{12}H_{25}$ | ↑ |
| Compound I-(163) | ↑ | $CH_3OC_2H_4$ | $SCH_3$ |
| Compound I-(164) | ↑ | $C_2H_4OC_2H_5$ | Cl |
| Compound I-(165) | ↑ | n-$C_3H_7OC_2H_4$ | ↑ |
| Compound I-(166) | ↑ | $C_2H_5OC_3H_6$ | ↑ |
| Compound I-(167) | ↑ | $C_2H_5OC_4H_8$ | S-iso-$C_6H_{13}$ |

Diiminoisoindoline Compound

The synthetic intermediate of the phthalocyanine compound of the invention is a diiminoisoindoline compound of general formula (VI).

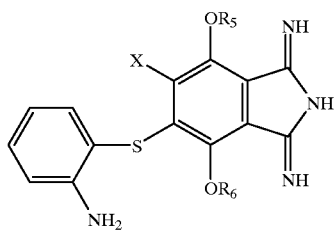

(VI)

wherein $R_5$, $R_6$, and X have the same meanings as defined hereinbefore.

Referring to the above diiminoisoindoline compound of general formula (VI), $R_5$ and $R_6$ each represents alkyl or alkoxyalkyl and may be the same species as R of the phthalocyanine compound of general formula (I) or $R_1$–$R_4$ of the phthalocyanine compounds of general formulas (II)–(V). X represents halogen, alkylthio, phenylthio which may be substituted, or naphthylthio which may be substituted and, in any of the cases, may be the same species as X of the phthalocyanine compound of general formula (I) or X of the phthalocyanine compounds of general formulas (II)–(V).

The following is a partial list of species of the diiminoisoindoline compound of general formula (VI) according to the present invention.

VI-(1) 5-(2-Aminophenylthio)-6-chloro-1,3-diimino-4,7-dimethoxyisoindoline

VI-(2) 5-(2-Aminophenylthio)-6-bromo-1,3-diimino-4,7-dimethoxyisoindoline

VI-(3) 5-(2-Aminophenylthio)-6-n-octylthio-1,3-diimino-4,7-dimethoxyisoindoline

VI-(4) 5-(2-Aminophenylthio)-6-n-undecylthio-1,3-diimino-4,7-dimethoxyisoindoline VI-(5) 5-(2-Aminophenylthio)-6-chloro-1,3-diimino-4,7-diethoxyisoindoline VI-(6) 5-(2-Aminophenylthio)-6-fluoro-1,3-diimino-4,7-diethoxyisoindoline VI-(7) 5-(2-Aminophenylthio)-6-n-nonylthio-1,3-diimino-4,7-diethoxyisoindoline VI-(8) 5-(2-Aminophenylthio)-6-n-dodecylthio-1,3-diimino-4,7-diethoxyisoindoline VI-(9) 5-(2-Aminophenylthio)-6-(4-n-butylphenylthio)-1,3-diimino-4,7-diethoxyisoindoline VI-(10) 5-(2-Aminophenylthio)-6-chloro-1,3-diimino-4,7-di-n-propoxyisoindoline VI-(11) 5-(2-Aminophenylthio)-6-(4-sec-heptylthio)-1,3-diimino-4,7-di-n-propoxyisoindoline VI-(12) 5-(2-Aminophenylthio)-6-(4-n-butoxyphenylthio)-1,3-diimino-4,7-di-n-propoxyisoindoline VI-(13) 5-(2-Aminophenylthio)-6-chloro-1,3-diimino-4,7-di-iso-propoxyisoindoline VI-(14) 5-(2-Aminophenylthio)-6-n-pentylthio-1,3-diimino-4,7-di-iso-propoxyisoindoline VI-(15) 5-(2-Aminophenylthio)-6-chloro-1,3-diimino-4,7-di-n-butoxyisoindoline VI-(16) 5-(2-Aminophenylthio)-6-(4-di-n-butyl-aminophenylthio)-1,3-diimino-4,7-di-n-butoxyisoindoline VI-(17) 5-(2-Aminophenylthio)-6-cyclohexylthio-1,3-diimino-4,7-di-n-butoxyisoindoline VI-(18) 5-(2-Aminophenylthio)-6-chloro-1,3-diimino-4,7-di-sec-butoxyisoindoline VI-(19) 5-(2-Aminophenylthio)-6-fluoro-1,3-diimino-4,7-di-sec-butoxyisoindoline VI-(20) 5-(2-Aminophenylthio)-6-bromo-1,3-diimino-4,7-di-sec-butoxyisoindoline VI-(21) 5-(2-Aminophenylthio)-6-phenylthio-1,3-diimino-4,7-di-sec-butoxyisoindoline VI-(22) 5-(2-Aminophenylthio)-6-chloro-1,3-diimino-4,7-di-iso-butoxyisoindoline VI-(23) 5-(2-Aminophenylthio)-6-tert-butylphenylthio-1,3-diimino-4,7-di-iso-butoxyisoindoline VI-(24) 5-(2-Aminophenylthio)-6-bromo-1,3-diimino-4,7-di-iso-butoxyisoindoline VI-(25) 5-(2-Aminophenylthio)-6-chloro-1,3-diimino-4,7-di-n-pentoxyisoindoline VI-(26) 5-(2-Aminophenylthio)-6-fluoro-1,3-diimino-4,7-di-n-pentoxyisoindoline VI-(27) 5-(2-Aminophenylthio)-6-(4-chlorophenylthio)-1,3-diimino-4,7-di-n-pentoxyisoindoline VI-(28) 5-(2-Aminophenylthio)-6-methylthio-1,3-diimino-4,7-di-n-pentoxyisoindoline VI-(29) 5-(2-Aminophenylthio)-6-chloro-1,3-diimino-4,7-di-iso-pentoxyisoindoline VI-(30) 5-(2-Aminophenylthio)-6-bromo-1,3-diimino-4,7-di-iso-pentoxyisoindoline VI-(31) 5-(2-Aminophenylthio)-6-fluoro-1,3-diimino-4,7-di-iso-pentoxyisoindoline VI-(32) 5-(2-Aminophenylthio)-6-ethylthio-1,3-diimino-4,7-di-iso-pentoxyisoindoline VI-(33) 5-(2-Aminophenylthio)-6-iso-propylthio-1,3-diimino-4,7-di-iso-pentoxyisoindoline VI-(34) 5-(2-Aminophenylthio)-6-(4-methoxyphenylthio)-1,3-diimino-4,7-di-iso-pentoxyisoindoline VI-(35) 5-(2-Aminophenylthio)-6-(naphthylthio-2-yl)-1,3-diimino-4,7-di-iso-pentoxyisoindoline VI-(36) 5-(2-Aminophenylthio)-6-(naphthylthio-1-yl)-1,3-diimino-4,7-di-iso-pentoxyisoindoline VI-(37) 5-(2-Aminophenylthio)-6-(4-dimethylaminophenylthio)-1,3-diimino-4,7-di-isopentoxyisoindoline VI-(38) 5-(2-Aminophenylthio)-6-(4-ethoxyphenylthio)-1,3-diimino-4,7-di-iso-pentoxyisoindoline VI-(39) 5-(2-Aminophenylthio)-6-(4-bromophenylthio)-1,3-diimino-4,7-di-iso-pentoxyisoindoine VI-(40) 5-(2-Aminophenylthio)-6-(2,4-dichlorophenylthio)-1,3-diimino-4,7-di-isopentoxyisoindoline VI-(41) 5-(2-Aminophenylthio)-6-n-butylthio-1,3-diimino-4, 7-di-iso-pentoxyisoindoline VI-(42) 5-(2-Aminophenylthio)-6-chloro-1,3-diimino-4,7-di-sec-pentoxyisoindoline VI-(43) 5-(2-Aminophenylthio)-6-ethylthio-1,3-diimino-4,7-di-sec-pentoxyisoindoline VI-(44) 5-(2-Aminophenylthio)-6-n-propylthio-1,3-diimino-4,7-di-sec-pentoxyisoindoline VI-(45) 5-(2-Aminophenylthio)-6-chloro-1,3-diimino-4,7-di-neo-pentoxyisoindoline VI-(46) 5-(2-Aminophenylthio)-6-chloro-1,3-diimino-4,7-di-n-hexyloxyisoindoline VI-(47) 5-(2-Aminophenylthio)-6-bromo-1,3-diimino-4,7-di-n-hexyloxyisoindoline VI-(48) 5-(2-Aminophenylthio)-6-fluoro-1,3-diimino-4,7-di-n-hexyloxyisoindoline VI-(49) 5-(2-Aminophenylthio)-6-neo-pentylthio-1,3-diimino-4,7-di-n-hexyloxyisoindoline VI-(50) 5-(2-Aminophenylthio)-6-chloro-1,3-diimino-4,7-di-iso-hexyloxyisoindoline VI-(51) 5-(2-Aminophenylthio)-6-iso-propylthio-1,3-diimino-4,7-di-iso-hexyloxyisoindoline VI-(52) 5-(2-Aminophenylthio)-6-bromo-1,3-diimino-4,7-di-iso-hexyloxyisoindoline VI-(53) 5-(2-Aminophenylthio)-6-fluoro-1,3-diimino-4,7-di-iso-hexyloxyisoindoline VI-(54) 5-(2-Aminophenylthio)-6-(4-methylphenylthio)-1,3-diimino-4,7-di-iso-hexyloxyisoindoline VI-(55) 5-(2-Aminophenylthio)-6-chloro-1,3-diimino-4,7-di-n-heptyloxyisoindoline VI-(56) 5-(2-Aminophenylthio)-6-(2,4-dimethylphenylthio)- 1,3-diimino-4,7-di-n-heptyloxyisoindoline VI-(57) 5-(2-Aminophenylthio)-6-chloro-1,3-diimino-4,7-di-iso-heptyloxyisoindoline VI-(58) 5-(2-Aminophenylthio)-6-n-pentylthio-1,3-diimino-4,7-di-iso-heptyloxyisoindoline VI-(59) 5-(2-Aminophenylthio)-6-fluoro-1,3-diimino-4,7-di-iso-heptyloxyisoindoline VI-(60) 5-(2-Aminophenylthio)-6-(4-dimethylaminophenylthio)-1,3-diimino-4,7-di-iso-heptyloxyisoindoline VI-(61) 5-(2-Aminophenylthio)-6-chloro-1,3-diimino-4,7-di-n-octyloxyisoindoline VI-(62) 5-(2-Aminophenylthio)-6-fluoro-1,3-diimino-4,7-di-n-octyloxyisoindoline VI-(63) 5-(2-Aminophenylthio)-6-bromo-1,3-diimino-4,7-di-n-octyloxyisoindoline VI-(64) 5-(2-Aminophenylthio)-6-(4-fluorophenylthio)-1,3-diimino-4,7-di-n-octyloxyisoindoline VI-(65) 5-(2-Aminophenylthio)-6-methylthio-1,3-diimino-4,7-di-n-octyloxyisoindoline VI-(66) 5-(2-Aminophenylthio)-6-chloro-1,3-diimino-4,7-di(2-ethylhexyloxy)isoindoline VI-(67) 5-(2-Aminophenylthio)-6-chloro-1,3-diimino-4,7-di-n-nonyloxyisoindoline VI-(68) 5-(2-Aminophenylthio)-6-iso-pentylthio-1,3-diimino-4,7-di-n-nonyloxyisoindoline VI-(69) 5-(2-Aminophenylthio)-6-chloro-1,3-diimino-4,7-di-n-decyloxyisoindoline VI-(70) 5-(2-Aminophenylthio)-6-fluoro-1,3-diimino-4,7-di-n-decyloxyisoindoline VI-(71) 5-(2-Aminophenylthio)-6-chloro-1,3-diimino-4,7-di-n-undecyloxyisoindoline VI-(72) 5-(2-Aminophenylthio)-6-chloro-1,3-diimino-4,7-di-n-dodecyloxyisoindoline VI-(73) 5-(2-Aminophenylthio)-6-chloro-1,3-diimino-4,7-di-(2-methoxyethoxy)isoindoline VI-(74) 5-(2-Aminophenylthio)-6-n-hexylthio-1,3-diimino-4,7-di-(2-methoxyethoxy)isoindoline VI-(75) 5-(2-Aminophenylthio)-6- iso-hexylthio-1,3-diimino-4,7-di-isoindoline VI-(76) 5- (2-Aminophenylthio)-6-sec-hexylthio-1,3-diimino-4,7-di-(2-ethoxyethoxy)isoindoline VI-(77) 5-(2-Aminophenylthio)-6-chloro-1,3-diimino-4,7-di-(2-ethoxyethoxy)isoindoline VI-(78) 5-(2-Aminophenylthio)-6-chloro-1,3-diimino-4,7-di-(2-n-propoxyethoxy)isoindoline VI-(79) 5-(2-Aminophenylthio)-6-bromo-1,3-diimino-4,7-di-(2-n-propoxyethoxy)isoindoline VI-(80) 5-(2-Aminophenylthio)-6-chloro-1,3-diimino-4,7-di-(2-iso-propoxyethoxy)isoindoline VI-(81) 5-(2-Aminophenylthio)-6-n-heptylthio-1,3-diimino-4,7-di-(2-iso-propoxyethoxy)isoindoline VI-(82) 5-(2-Aminophenylthio)-6-(2-ethylhexylthio)-1,3-diimino-4,7-di-(2-iso-propoxyethoxy)isoindoline VI-(83) 5-(2-Aminophenylthio)-6-chloro-1,3-diimino-4,7-di-(3-ethoxypropoxy)isoindoline VI-(84) 5-(2-Aminophenylthio)-6-bromo-1,3-diimino-4,7-di-(3-ethoxypropoxy)isoindoline VI-(85) 5-(2-Aminophenylthio)-6-chloro-1,3-diimino-4,7-di-(4-ethoxybutoxy)isoindoline VI-(86) 5-(2-Aminophenylthio)-6-fluoro-1,3-diimino-4,7-di-(4-ethoxybutoxy)isoindoline VI-(87) 5-(2-Aminophenylthio)-6-(4-ethylphenylthio)-1,3-diimino-4,7-di-(4-ethoxybutoxy)isoindoline VI-(88) 5-(2-Aminophenylthio)-6-(4-n-propylphenylthio)-1,3-diimino-4,7-di-(4-ethoxybutoxy)isoindoline VI-(89) 5-(2-Aminophenylthio)-6-chloro-1,3-diimino-4-n-octyloxy-7-iso-pentoxyisoindoline VI-(90) 5-(2-Aminophenylthio)-6-chloro-1,3-diimino-4-(2-methoxyethoxy)-7-isopentoxyisoindoline VI-(91) 5-(2-Aminophenylthio)-6-phenylthio-1,3-diimino-4- (2-methoxyethoxy) -7-isopentoxyisoindoline

VI-(92) 5-(2-Aminophenylthio)-6-(4-tert-butylphenylthio)-1,3-diimino-4,7-di-iso-pentoxyisoindoline

Process for Producing the Phthalocyanine Compound

To produce the phthalocyanine compound of the invention, the above diiminoisoindoline compound of general formula (VI) is reacted with a metal or metal derivative.

The metal and metal derivative mentioned above include Al, Si, Ti, V, Mn, Fe, Co, Ni, Cu, Zn, Ge, Ru, Rh, Pd, In, Sn, Pt, Pb, and the corresponding halides, carboxylates, sulfates, nitrates, carbonyl compounds, oxides, and complex compounds. Particularly preferred are the halides and carboxylates of said metals, such as copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, manganese acetylacetonate, manganese chloride, lead chloride, lead acetate, indium chloride, titanium chloride, titanium chloride, among others.

The metal or metal derivative is used in a ratio of 0.1–0.6 molar equivalents, preferably 0.20–0.5 molar equivalents, to each molar equivalent of the diiminoisoindoline compound of general formula (VI).

The reaction temperature is 100–300° C., preferably 130–220° C.

This reaction is preferably carried out in a solvent.

The preferred solvent is an organic solvent having a boiling point of not less than 60° C., preferably no less than 80° C. The solvent as such includes but is not limited to various alcoholic solvents such as methanol, ethanol, n-propyl alcohol, n-butyl alcohol, isobutyl alcohol, t-butyl alcohol, n-amyl alcohol, n-hexanol, cyclohexanol, 2-methyl-1-pentanol, 1-heptanol, 2-heptanol, 1-octanol, 2-ethylhexanol, benzyl alcohol, ethylene glycol, propylene glycol, ethoxyethanol, propoxyethanol, butoxyethanol, dimethylaminoethanol, diethylaminoethanol, etc., and high-boiling organic solvents such as trichlorobenzene, chloronaphthalene, sulfolane, nitrobenzene, quinoline, urea, and so forth.

The solvent is used in a ratio of 0.5–50 parts by weight, preferably 1–15 parts by weight, to each 1 part by weight of the diiminoisoindoline compound of general formula (VI).

This reaction proceeds in the presence or absence of a catalyst. The catalyst that can be used includes various inorganic catalysts, typically ammonium molybdate, and various basic organic catalysts such as DBU (1,8-diazabicyclo[5.4.0]-7-undecene), DBN (1,5-diazabicyclo[4.3.0]-5-nonene), etc. The level of addition of the catalyst is 0.01–10 moles, preferably 0.1–2 moles, per mole of the diiminoisoindoline compound.

After the reaction, the objective compound can be isolated from the reaction mixture by the routine procedure such as distillative removal of the solvent or pouring of the reaction mixture into a poor solubility solvent for the phthalocyanine compound and recovery of the resulting precipitate by filtration. The thus-produced phthalocyanine compound of the invention can be directly put to use as a near infrared ray absorbing material or a light-heat conversion material but may be further purified by recrystallization, column chromatography, or the like purification technique to provide the objective product of higher purity.

Process for Producing the Diiminoisoindoline Compound

To provide the diiminoisoindoline compound (VI) which is a synthetic intermediate of the phthalocyanine compound of the invention, a phthalonitrile compound of general formula (VII) is reacted with ammonia in the presence of a metal alkoxide.

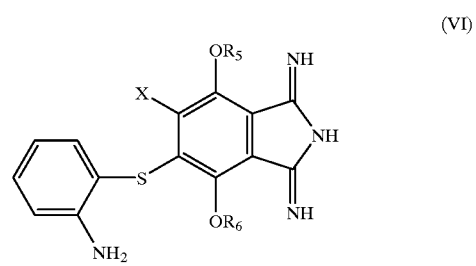

(VI)

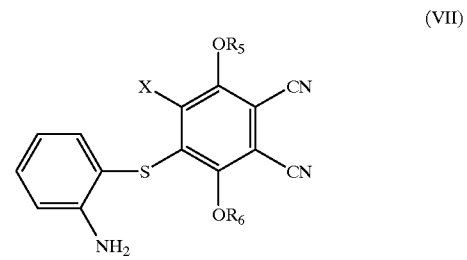

(VII)

In the above formulas (VI) and (VII), $R_5$, $R_6$, and X have the same meanings as defined hereinbefore.

The process for producing the diiminoisoindoline compound of general formula (VI) is now described in detail.

The metal alkoxide which can be used includes the methoxide, ethoxide, n-propoxide, n-butoxide, n-pentoxide, n-hexyloxide, n-heptyloxide, n-octyloxide, 2-methoxyethoxide, 2-ethoxyethoxide, 2-n-butoxyethoxide, etc. of sodium or potassium. The level of addition of the metal alkoxide is 0.01–5 moles, preferably 0.1–2.0 moles, per mole of compound (VII).

This reaction is preferably carried out in the presence of an organic solvent and as this organic solvent an alcoholic solvent is generally used.

The alcoholic solvent mentioned above includes but is not limited to methanol, ethanol, n-propanol, n-butanol, n-pentanol, n-hexanol, n-heptanol, n-octanol, 2-methoxyethanol, 2-ethoxyethanol, and 2-n-butoxyethanol. The level of use of the alcoholic solvent is 200 mL–15 L, preferably 500 mL–5 L, per mole of compound (VII).

The production of the diiminoisoindoline compound of general formula (VI) can be carried out typically by adding sodium metal or potassium metal to the reaction solvent alcohol to prepare an alcoholic metal alkoxide solution in the first place and then feeding ammonia and the phthalonitrile compound of general formula (VII) for reaction. An alternative procedure comprises feeding ammonia, phthalonitrile compound (VII), and separately prepared metal alkoxide into the solvent for reaction. The level of use of the metal is 0.01–5.0 moles, preferably 0.1–2.0 moles, per mole of compound (VII).

The level of use of ammonia is 1–20 moles, preferably 3–10 moles, per mole of compound (VII).

The reaction temperature is 0° C. through the reflux temperature of the solvent, preferably 20° C. through the reflux temperature.

The preferred reaction time is 30 minutes through 72 hours.

After the reaction, the solvent is distilled off and the residue is extracted with an aromatic organic solvent such as toluene, washed with water, and concentrated to provide the diiminoisoindoline compound of general formula (VI).

Near Infrared Ray Absorbing Material

The present invention is further directed to a near infrared ray absorbing material containing said phthalocyanine compound.

The phthalocyanine compound of the invention can be used as a near infrared ray absorbing material in various applications, by integrating it, either alone or in combination with a binder and other additives, with various matrices such as paper, plastic sheet or film, glass, resin or the like by such integration means as coating, kneading, hard coating, or polymerization with monomers. Thus, it can be used in such applications as the near infrared ray absorbing filter, protective goggles, agricultural film, thermal ray-shielding filter, light-receiving device, long wavelength laser-compatible optical recording medium, fraud-proof printing ink, camouflage paint, etc.

For use as a near infrared ray absorbing material, the phthalocyanine compound of the invention is preferably provided in the form of a resin-based composition obtainable by such techniques as mixing, dispersing or coating or polymerization of its mixtures with monomers.

The near infrared ray absorbing material can be fabricated by mixing the phthalocyanine compound of the invention with a transparent resin such as poly-acrylonitrile resin, polymethacrylonitrile resin, poly(methyl methacrylate) resin, ABS resin, polystyrene resin, or poly(ethylene terephthalate) resin, dipping said resin in a solution or dispersion of the phthalocyanine compound of the invention in a solvent and heat-treating the same, or coating said resin with such a solution.

Shaped articles can also be manufactured by mixing the phthalocyanine compound of the invention with one or more monomers such as hexamethylene diisocyanate, isophorone diisocyanate, tolylene diisocyanate, 4,4'-diphenylmethane diisocyanate, mesitylene triisocyanate, 1,4-bis($\alpha$, $\alpha$'-dimethylisocyanatomethyl)benzene, 1,3,5-tris(3-thiopropyl)isocyanurate, 2,2'-dimethylpropanediol bis(2-thioacetate), etc. and polymerizing the mixture.

The technology for manufacture of lenses for protective goggles includes a method which comprises dissolving or dispersing the phthalocyanine compound of the invention in a high-refractive-index lens resin and injection-molding the solution or dispersion.

The near infrared ray absorbing material containing the phthalocyanine compound of the invention is so high in light fastness that its absorption characteristic does not deteriorate with aging, thus being of use in a broad field where the conventional material could not be used.

Light-Heat Conversion Material

The present invention is further directed to a light-heat conversion material containing said phthalocyanine compound.

The phthalocyanine compound of the invention absorbs in the near infrared region of the spectrum within the range of 800 to 1200 nm with a high absorption coefficient. Therefore, as a light-heat conversion material which absorbs laser light within this frequency band to output a thermal energy, the phthalocyanine compound of the invention can be used with advantage as an original plate for laser direct platemaking by the computer-to-plate technique, a laser heat-sensitive recording material, or a laser thermographic material.

The light-heat conversion material mentioned above can be fabricated in the same manner as the near infrared ray absorbing material described above. For example, depending on the intended use, the following manufacturing methods can be employed.

The light-heat conversion material of the invention may contain a binder resin or the like in addition to the phthalocyanine compound of the invention which is a light-heat converting agent.

As the light-heat converting agent, the phthalocyanine compound of the invention can be used in combination with various known near-infrared-light-absorbing agents within the limits not contrary to the object of the invention.

The concomitant near-infrared-light-absorbing agent which can be used in this manner includes the common pigments such as carbon black, aniline black, etc. and the polymethine dyes (cyanine dyes), phthalocyanine dyes, dithiol metal complex salt dyes, naphthoquinone dyes, anthraquinone dyes, triphenylmethane (analog) dyes, aluminum dyes, diimmonium dyes, azo dyes, indoaniline metal complex dyes, and intermolecular CT dyes, etc. which are described in Near Infrared Ray Absorbing Dyes, "Chemical Industry" 1986, May Issue (p.45–51) and/or Chapter 2, 2.3 "Development and Market Trend of Functional Dyes in the Nineties", CMC (1990).

The binder resin which can be used is not particularly restricted but includes, among others, homo- or copolymers of acrylic monomers such as acrylic acid, methacrylic acid, acrylic esters, and methacrylic esters, cellulosic polymers such as methylcellulose, ethylcellulose, cellulose acetate, etc., vinyl polymers and copolymers such as polystyrene, vinyl chloride-vinyl acetate copolymer, polyvinylpyrrolidone, polyvinyl butyral, polyvinyl alcohol, etc., condensation polymers such as polyesters and polyamides, rubber-like thermoplastic polymers such as butadiene-styrene copolymer etc., and polymers available upon polymerization and crosslinking of photopolymerizable compounds such as epoxy compounds.

When the light-heat conversion material of the invention is put to use as a recording medium such as a laser thermographic material or a laser heat-sensitive recording material, a chromogenic substance or a coloring agent may be formulated with the light-heat conversion material or a discrete layer containing the chromogenic substance or coloring agent may be provided. As the chromogenic substance or coloring agent, a variety of substances so far proposed, such as sublimable dyes and pigments, electron donating dye precursor-electron acceptor systems, and polymerizable polymers capable of undergoing physical or chemical change imagewise upon heating, can be utilized.

The coloring agent for a laser thermographic material, for instance, includes but is not limited to pigment series coloring agents such as inorganic pigments, e.g. titanium dioxide, carbon black, zinc oxide, Prussian blue, cadmium sulfide, iron oxide, and chromates of lead, zinc, barium, and calcium, and organic pigments, e.g. azo, thioindigo, anthraquinone, anthoanthrone, triphendioxazine, phthalocyanine, quinacridone and other compounds. As dye series coloring agents, acid dyes, direct dyes, dispersed dyes, oil-soluble dyes, and metal-containing oil-soluble dyes can be mentioned.

The chromogenic substance for a laser heat-sensitive recording material includes but is not limited to those chromogenic substances which are conventionally employed for heat-sensitive recording. The electron donating dye precursor includes those compounds having the property to develop colors by donating an electron or accepting a proton from an acid or the like and containing a partial skeletal structure, such as a lactone, lactam, sultone, spiropyran, ester or amide, which undergoes ring-opening or cleavage on contact with an electron accepting compound. For example, triphenylmethane compounds, fluoran compounds, phenothiazine compounds, indolylphthalide compounds, leucoauramine compounds, rhodaminelactam compounds, triphenylmethane phthalide compounds, triazene compounds, spiropyran compounds, and fluorene compounds can be mentioned. The electron acceptor includes phenolic compounds, organic acids and metal salts thereof, and hydroxybenzoic acid esters, among others.

The light-heat conversion material of the invention can be applied with advantage to the original plate for direct planographic platemaking by the CTP technique. The original plate for CTP comprises a support and a light-heat conversion layer disposed thereon. Optionally, a silicone rubber layer and, further, a protective layer may be superimposed on the light-heat conversion layer.

The light-heat conversion layer contains not only the above-mentioned light-heat conversion material but also an image-forming component and a binder resin. As an alternative, a layer containing the image-forming component may be superimposedly constructed on said light-heat conversion layer.

The image forming component which can be used includes the variety of known components capable of forming an image by undergoing physical or chemical change under heat. Thus, the component may for example be a microencapsulated heat-fusible substance-binder resin system as disclosed in Kokai Tokkyo Koho H3-108588, an active hydrogen-containing binder-blocked isocyanate composition as supported on a support having a hydrophilic surface as disclosed in Japanese Patent Publication-S62-164049, a microencapsulated lipophilic substance-hydrophilic binder polymer system as disclosed in Kokai Tokkyo Koho E7-1849, an acid precursor-vinyl ether-containing compound-alkali-soluble resin system as disclosed in Kokai Tokkyo Koho H8-220752, a hydroxyl-containing macromolecular compound-o-naphthoquinone diazide system as disclosed in Kokai Tokkyo Koho H9-5993, a nitrocellulose system as described in Kokai Tokkyo Koho H9-131977, or a polymerization initiator-ethylenically unsaturated monomer, oligomer or macromonomer system as disclosed in Kokai Tokkyo Koho H9-146264. Thus, there is no particular limitation on the image-forming system that can be used. Depending on cases, the image maybe formed by the technology of superimposing a silicone rubber layer on the light-heat conversion layer (the light-sensitive layer or the thermographic layer) and, after imagewise exposure, either bringing the silicone rubber layer into intimate contact or peeling the layer off as described in Kokai Tokkyo Koho E9-80745, Kokai Tokkyo Koho H9-131977, and Kokai Tokkyo Koho H9-146264, among others.

The binder resin for use in the light-heat conversion layer includes but is not limited to homo- or copolymers of acrylic monomers such as acrylic acid, methacrylic acid, acrylic esters, and methacrylic esters, cellulosic polymers such as methylcellulose, ethylcellulose, cellulose acetate, etc., vinyl polymers and vinyl compound copolymers such as polystyrene, vinyl chloride-vinyl acetate copolymer, polyvinylpyrrolidone, polyvinyl butyral, polyvinyl alcohol, etc., condensation polymers such as polyesters and polyamides, rubber-like thermoplastic polymers such as butadiene-styrene copolymer etc., and polymers available upon polymerization and crosslinking of photopolymerizable compounds such as epoxy compounds.

The support material which can be used includes but is not limited to paper, plastic (e.g. polyethylene, polypropylene, polystyrene, etc.)-laminated paper, metal sheets such as sheets of aluminum (inclusive of alloyed aluminum), zinc, copper and other metals, and plastic films such as films of cellulose diacetate, cellulose triacetate, cellulose butyrate, polyethylene terephthalate, polyethylene, polystyrene, polypropylene, polycarbonate, polyvinyl acetal, etc. As typical examples, coated paper, aluminum and other metal sheets, polyethylene terephthalate and other plastic films, rubber sheet, and their composites can be mentioned. Preferred are aluminum or aluminum alloy sheets and plastic films. The thickness of the support may be 25 $\mu$m–3 mm, preferably 100 $\mu$m–500 $\mu$m.

Usually, the original plate for planographic printing is fabricated by dissolving or dispersing the light-heat conversion material, image-forming component, binder resin, etc. in an organic solvent or the like and coating a support with the solution or dispersion.

For improvements in adhesion and printing characteristics, a primer layer may be formed between the support and the light-heat conversion layer or the support itself may be surface-treated. The primer layer which can be applied includes but is not limited to a light-sensitive polymer layer photocured prior to construction of the light-heat conversion layer as disclosed in Kokai Tokkyo Koho S60-22903, a heat-cured epoxy resin layer as disclosed in Kokai Tokkyo Koho S62-50760, a hardened gelatin layer as disclosed in Kokai Tokkyo Koho S63-133151, a urethane resin-silane coupling agent system as disclosed in Kokai Tokkyo Koho H3-200965, and a urethane resin layer as disclosed in Kokai Tokkyo Koho E3-273248.

As the protective layer for protecting the surface of the light-heat conversion layer or the silicone rubber layer, a transparent film such as polyethylene film, polypropylene film, poly(vinyl chloride) film, poly (vinylidene chloride) film, polyvinyl alcohol film, poly(ethylene terephthalate) film, or cellophane film may be laminated or constructed by casting.

EXAMPLES

The following examples are intended to illustrate the present invention in further detail and should by no means be construed as defining the scope of the invention.

Example 1
Production of 5-(2-aminophenylthio) -6-chloro-1,3-diimino-4,7-diisopentoxyisoindoline [Compound VI-(29)]

To a solution of sodium metal (0.7 g) in n-propyl alcohol (200 mL) was fed gaseous ammonia at a flow rate of 120 mL/min. at room temperature for 1 hour. Then, 22.8 g of 4-(2-aminophenylthio)-5-chloro-3,6-diisopentoxyphthalonitrile was added and the mixture was stirred at 50–60° C. for 20 hours. After cooling, n-propyl alcohol was distilled off and the residue was dissolved in 200 mL of toluene under warming at 30–40° C. Then, 500 mL of water was added and the mixture was stirred for dispersing and allowed to stand for phase separation. The above procedure was repeated 4 times to wash the toluene solution. The toluene was then distilled off and 200 mL of n-heptane was added. The mixture was stirred at 60–65° C. for 30 minutes and then cooled to room temperature. The resulting crystals were collected and dried to provide 20.3 g (yield 85.8%) of S-(2-aminophenylthio)-6-chloro-1,3-diimino-4,7-diisopentoxyisoindoline.

Compound VI-(29)

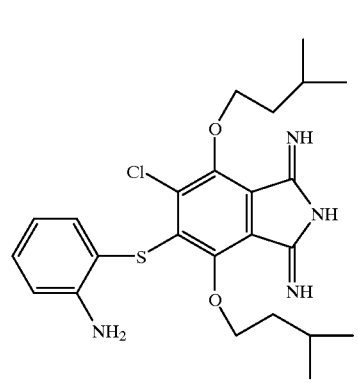

The elemental analysis, mass spectrum, and melting point of the above crystals were as follows. The infrared absorption spectrum of the compound is reproduced in FIG. 1.

Elemental analysis (for $C_{24}H_{31}ClN_4O_2S$): 475.05 M.W.

|  | C | H | N |
| --- | --- | --- | --- |
| Calcd. (%): | 60.68; | 6.58; | 11.79 |
| Found (%): | 60.65; | 6.56; | 11.81 |

MS (m/e): 474 (M⁺) m.p. 174.8–176.1° C.

Example 2
Production of 5-(2-aminophenylthio)-6-chloro-1,3-diimino-4,7-di-n-octyloxyisoindoline [Compound VI-(61)]

To a solution of sodium metal (0.9 g) in n-propyl alcohol (265 mL) was fed gaseous ammonia at a flow rate of 120 mL/min. at room temperature for 1 hour. Then, 35.8 g of 4-(2-aminophenylthio)-5-chloro-3,6-di-n-octyloxyphthalonitrile was added and the mixture was stirred at 50–60° C. for 20 hours. After cooling, the reaction mixture was worked up in the same manner as in Example 1 to provide 16.4 g (yield 44.4%) of 5-(2-aminophenylthio)-6-chloro-1,3-diimino-4,7-di-n-octyloxyisoindoline of the following chemical formula.

Compound VI-(61)

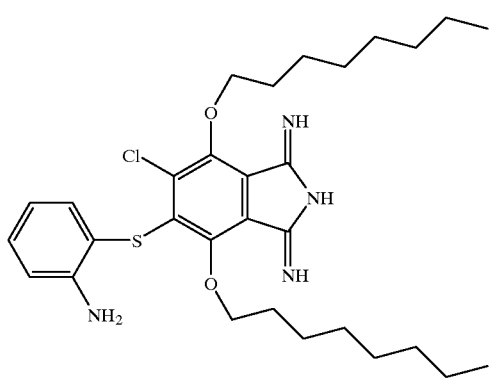

Figure 2:
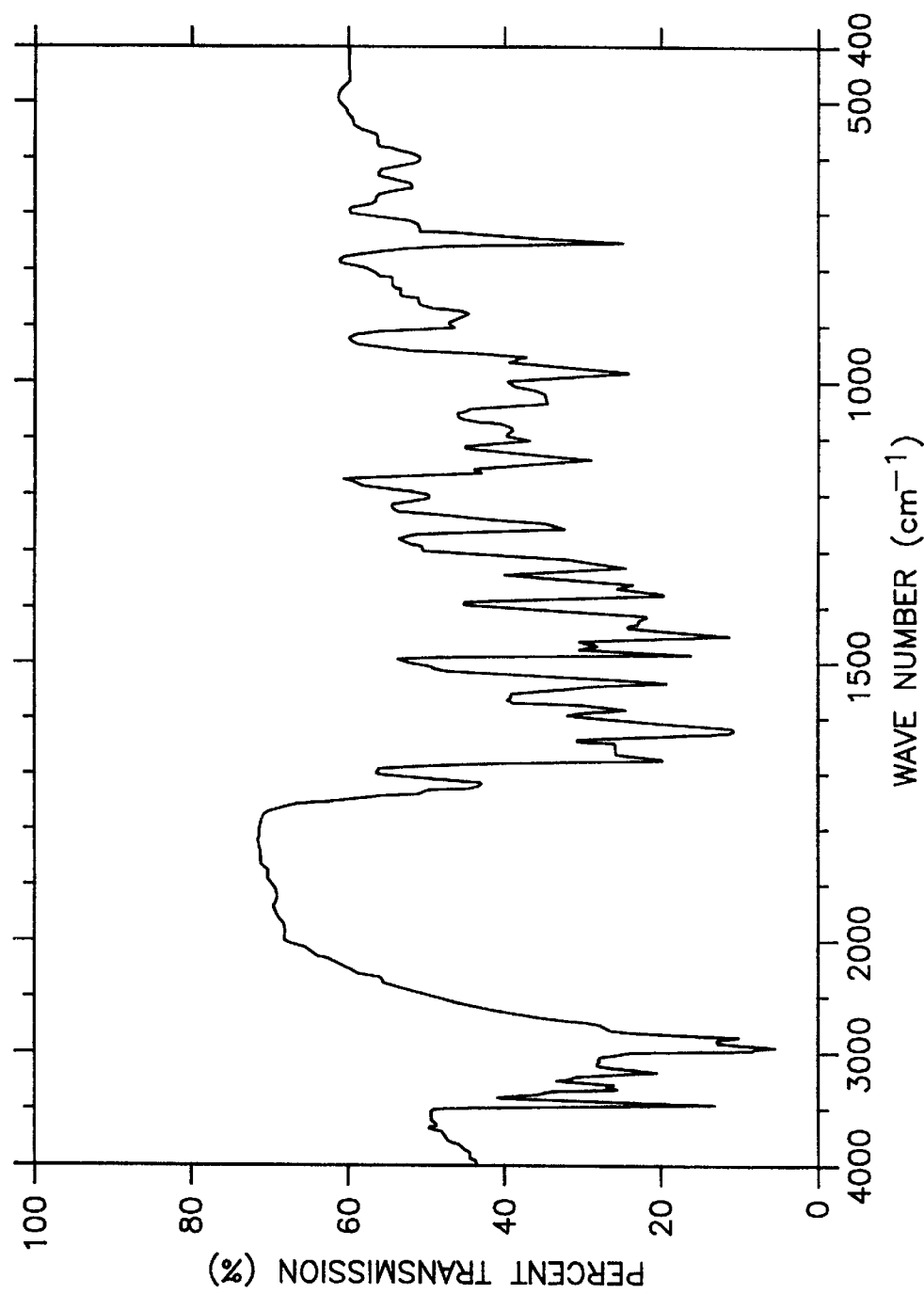
FIG. 2 shows an infrared absorption spectrum of 5-(2-aminophenylthio)-6-chloro-1,3-diimino-4,7-di-n-octyloxyisoindoline compound VI-(61) as synthesized in Example 2.

The elemental analysis, mass spectrum, and melting point of the above crystals were as follows. The infrared absorption spectrum of the compound is reproduced in FIG. 2.

Elemental analysis (for $C_{30}H_{43}ClN_4O_2S$): 559.21 M.W.

|  | C | H | N |
| --- | --- | --- | --- |
| Calcd. (%): | 64.43; | 7.75; | 10.02 |
| Found (%): | 64.42; | 7.78; | 10.05 |

MS (m/e): 559 (M⁺) m.p. 97–99° C.

Example 3
Production of 5-(2-aminophenylthio)-6-chloro-1,3-diimino-4,7-di-(2-ethoxyethoxy)isoindoline [Compound VI-(77)]

To a solution of sodium metal (0.8 g) in n-propyl alcohol (250 mL) was fed gaseous ammonia at a flow rate of 120 mL/min. at room temperature for 1 hour. Then, 27.6 g of 4-(2-aminophenylthio)-S-chloro-3,6-di-(2-ethoxyethoxy) isoindoline was added and the mixture was stirred at 50–60° C. for 20 hours. After cooling, the reaction mixture was worked up in the same manner as in Example 1 to provide 27.6 g (yield 96.2%) of 5-(2-aminophenylthio)-6-chloro-1,3-diimino-4,7-di-(2-ethoxyethoxy)isoindoline of the following chemical formula.

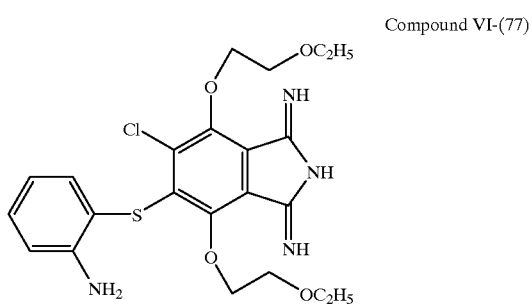

Compound VI-(77)

Figure 3:
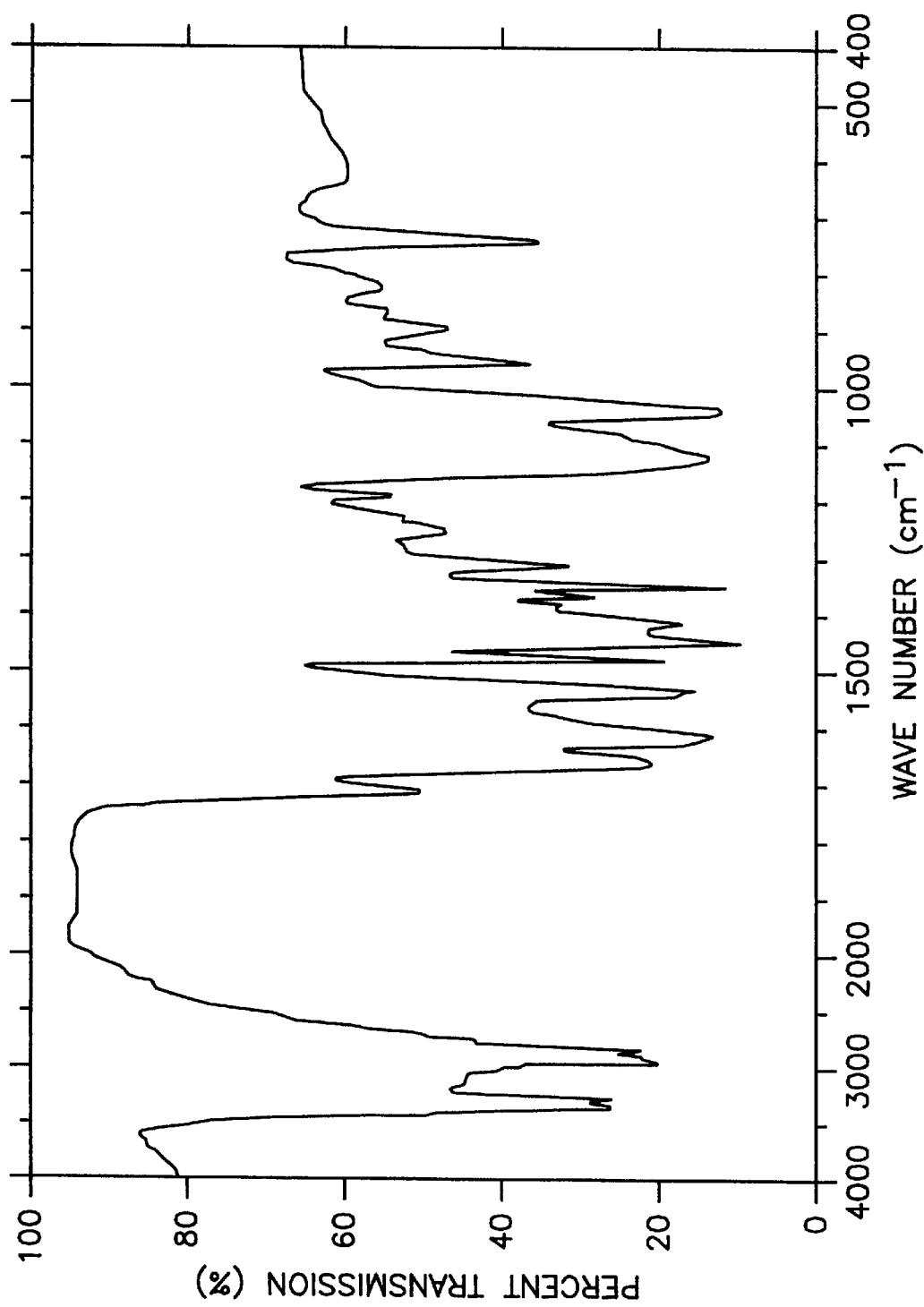
FIG. 3 shows an infrared absorption spectrum of 5-(2-aminophenylthio)-6-chloro-1,3-diimino-4,7-di-(2-ethoxyethoxy)isoindoline compound VI-(77) as synthesized in Example 3.

The elemental analysis, mass spectrum, and melting point of the above crystals were as follows. The infrared absorption spectrum of the compound is reproduced in FIG. 3.

Elemental analysis (for $C_{22}H_{27}ClN_4O_4S$) : 478.99 M.W.

|  | C | H | N |
|---|---|---|---|
| Calcd. (%): | 55.16; | 5.68; | 11.70 |
| Found (%): | 55.14; | 5.70; | 11.73 |

MS (m/e) 480 ($M^+$) m.p. 114–116° C.

Example 4
Production of 5-(2-aminophenylthio)-6-(4-tert-butylphenylthio)-1,3-diimino-4,7-diisopentoxyisoindoline [Compound VI-(92)]

To a solution of sodium metal (0.6 g) in n-propyl alcohol (200 mL) was fed gaseous ammonia at a flow rate of 120 mL/min. at room temperature for 1 hour. Then, 27.0 g of 4-(2-aminophenylthio)-5-(4-tert-butylphenylthio)-3,6-diisopentoxyphthalonitrile was added and the mixture was stirred at 50–60° C. for 20 hours. After cooling, the reaction mixture was worked up in the same manner as in Example 1 to provide 20.9 g (yield 75.2%) of 5-(2-aminophenylthio)-6-(4-tert-butylphenylthio)-1,3-diimino-4,7-diisopentoxyisoindoline of the following chemical formula.

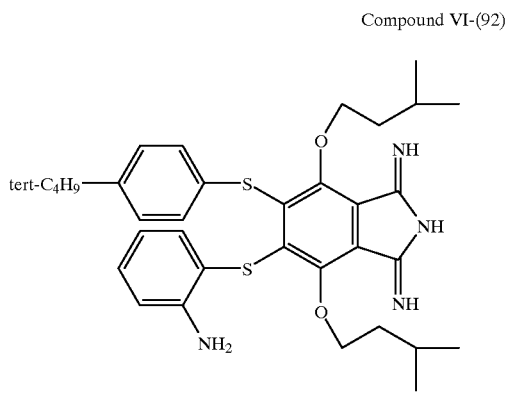

Compound VI-(92)

Figure 4:
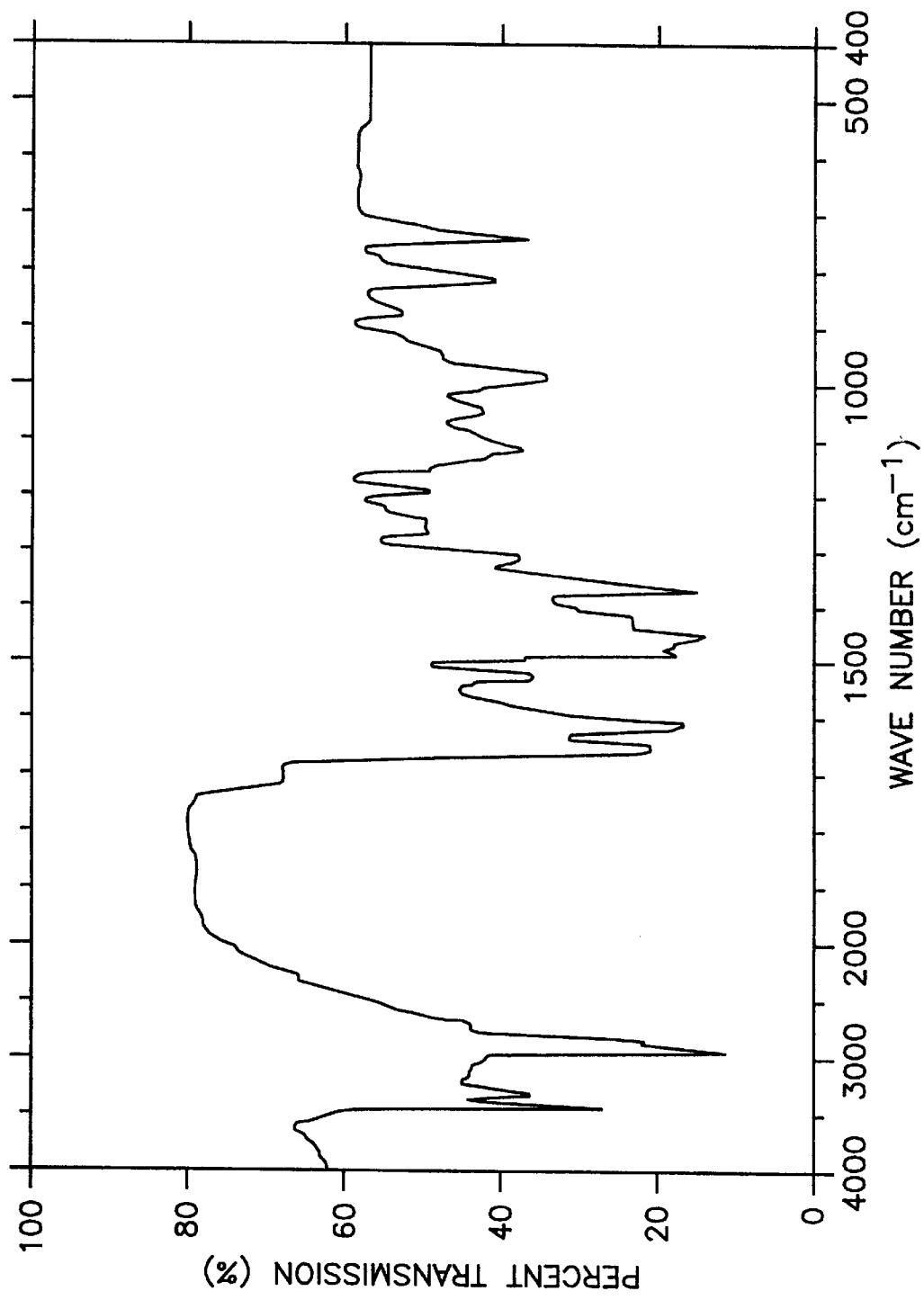
FIG. 4 shows an infrared absorption spectrum of 5-(2-aminophenylthio)-6-(4-tert-butylphenylthio)-1,3-diiminoisopentoxyisoindoline compound VI-(92) as synthesized in Example 4.

The elemental analysis, mass spectrum, and melting point of the above crystals were as follows. The infrared absorption spectrum of the compound is reproduced in FIG. 4.

Elemental analysis (for $C_{34}H_{44}N_4O_2S_2$) 604.87 M.W.

|  | C | H | N |
|---|---|---|---|
| Calcd. (%): | 67.51; | 7.33; | 9.26 |
| Found (%): | 67.49; | 7.35; | 9.28 |

MS (m/e): 605 ($M^++1$) m.p. 198–199° C.

Example 5
Production of a phthalocyanine compound [Compound I-(31)]

A mixture of 2-n-butoxyethanol (15 mL) and DBU (0.75 g) was heated to 145–155° C, and 4.75 g of the 5-(2-aminophenylthio)-6-chloro-1,3-diimino-4,7-diisopentoxyisoindoline obtained in Example 1 and 0.47 g of vanadium chloride were added. The mixture was then stirred at 155–160° C. for 3 hours, followed by cooling to 60–70° C., and 300 ml of methanol was added. After cooling to room-temperature, the reaction mixture was filtered and dried to recover 3.6 g of black-green powders. The powders were purified by column chromatography [silica gel/toluene:n-hexane (1:1)] to provide 2.5 g of purified black-green powders. This product was identified to be the objective compound by the following analyses.

Figure 5:
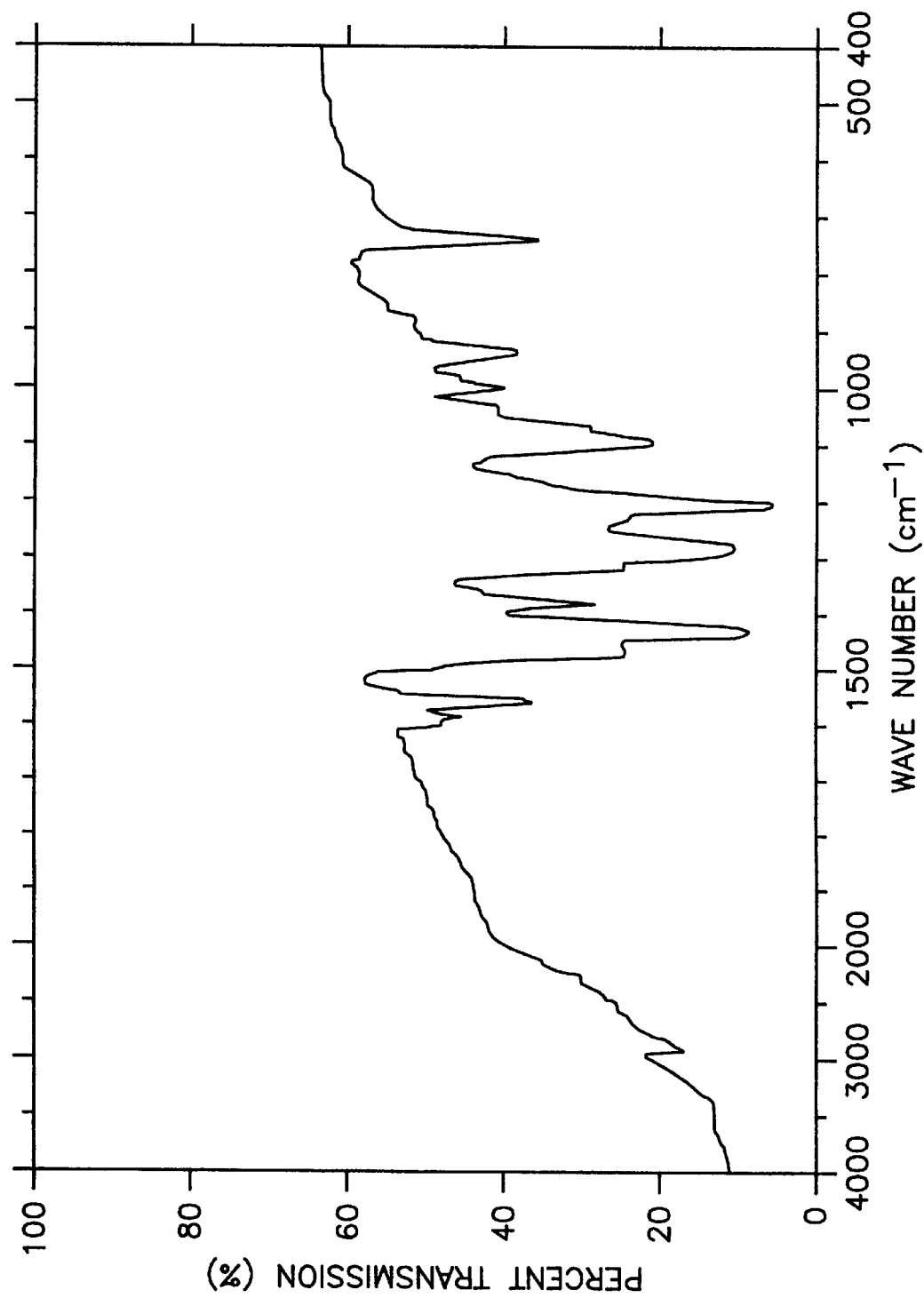
FIG. 5 shows an infrared absorption spectrum of phthalocyanine compound I-(31) as synthesized in Example 5.

The IR spectrum of the above compound is reproduced in FIG. 5.

Elemental analysis (for $C_{76}H_{64}Cl_4N_{12}O_5S_4V$): 1546.41 M.W.

|  | C | H | N |
|---|---|---|---|
| Calcd. (%): | 59.03; | 4.17; | 10.87 |
| Found (%): | 59.05; | 4.21; | 10.85 |

MS (m/e): 1545 ($M^+$)

Figure 6:
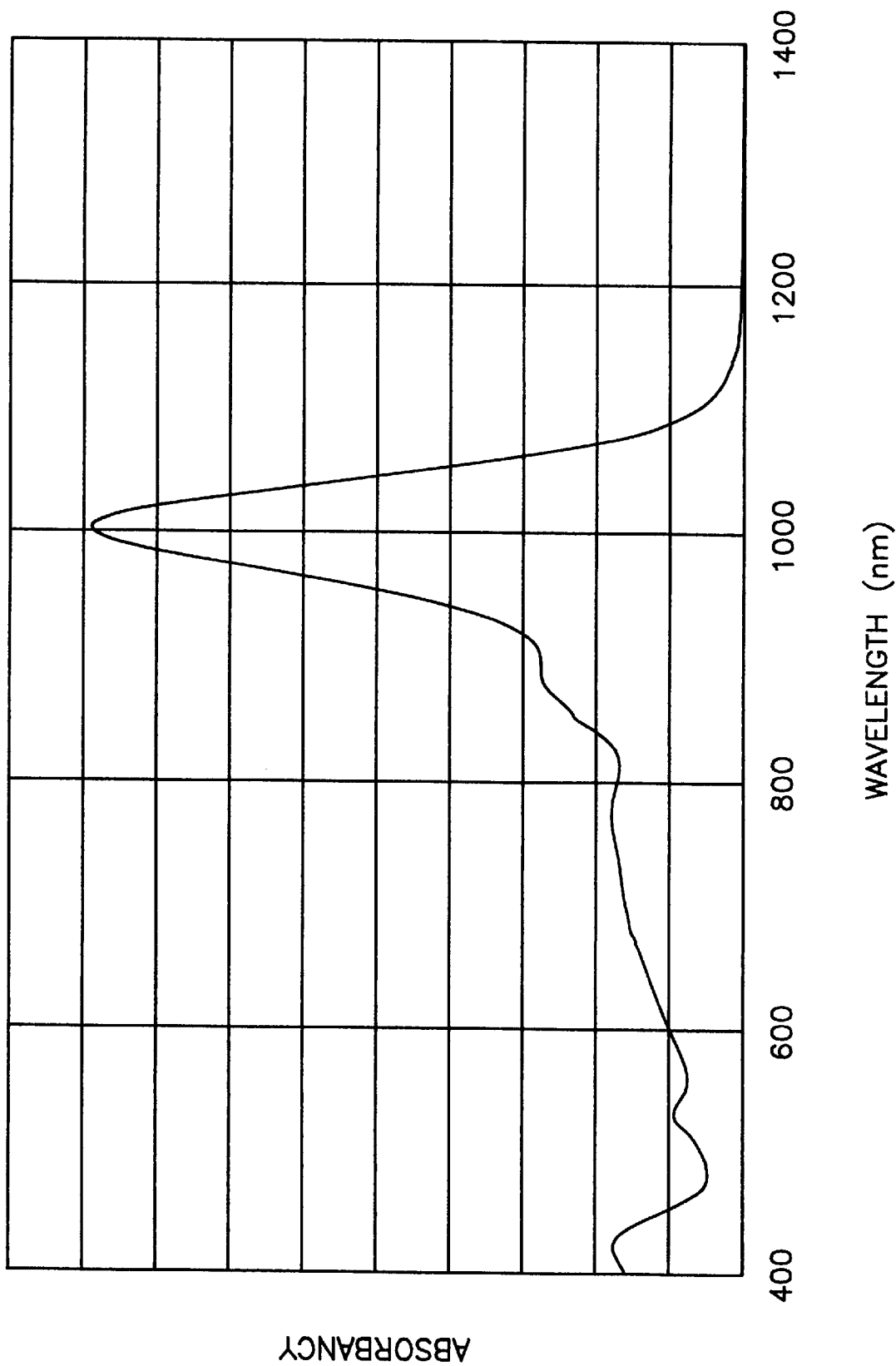
FIG. 6 shows an absorption spectrum of the phthalocyanine compound I-(31) synthesized in Example 5 as measured in toluene.

The toluenic solution of the above compound showed an absorption maximum at 1004.5 nm with a gram absorption coefficient of $8.29 \times 10^4$ ml/g·cm. The absorption spectrum is shown in FIG. 6.

Comparative Example 1
Production of a phthalocyanine compound [the compound disclosed in Kokai Tokkyo Koho H8-176101]

A mixture of 4-(2-aminophenylthio)-5-chloro-3,6-diisopentoxyphthalonitrile (12.6 g), vanadium chloride (1.9 g), DBU (7.8 g), and n-pentyl alcohol (78 mL) was refluxed with stirring for 48 hours. After cooling, the reaction mixture was withdrawn into 500 mL of methanol and the precipitate was collected by filtration and dried to recover 6.3 g of a crude product as black powders. The powders were purified by column chromatography (silica gel/toluene) to provide 2.8 g of a pure product as black powders.

The toluenic solution of the compound thus obtained showed an absorption maximum at 943 nm with a gram absorption coefficient of $4.76 \times 10^4$ ml/g·cm.

Example 6
Production of a phthalocyanine compound [Compound I-(32)]

A mixture of 2-n-butoxyethanol (15 mL) and DBU (0.75 g) was heated to 145–155° C. and 4.75 g of the 5-(2- aminophenylthio)-6-chloro-1,3-diimino-4,7-diisopentoxyisoindoline obtained in Example 1 and 0.3 g of copper(I) chloride were added. The mixture was stirred at 155–160° C. for 3 hours, followed by cooling to 60–70° C., and 300 ml of methanol was added. After cooling to room temperature, the reaction mixture was filtered and dried to give 3.6 g of black-green powders. The powders were purified by column chromatography [silica gel/toluene:n-hexane (3:1)] to provide 2.7 g of a pure product as black-blue powders. This product was identified to be the objective compound by the following analyses.

Figure 7:
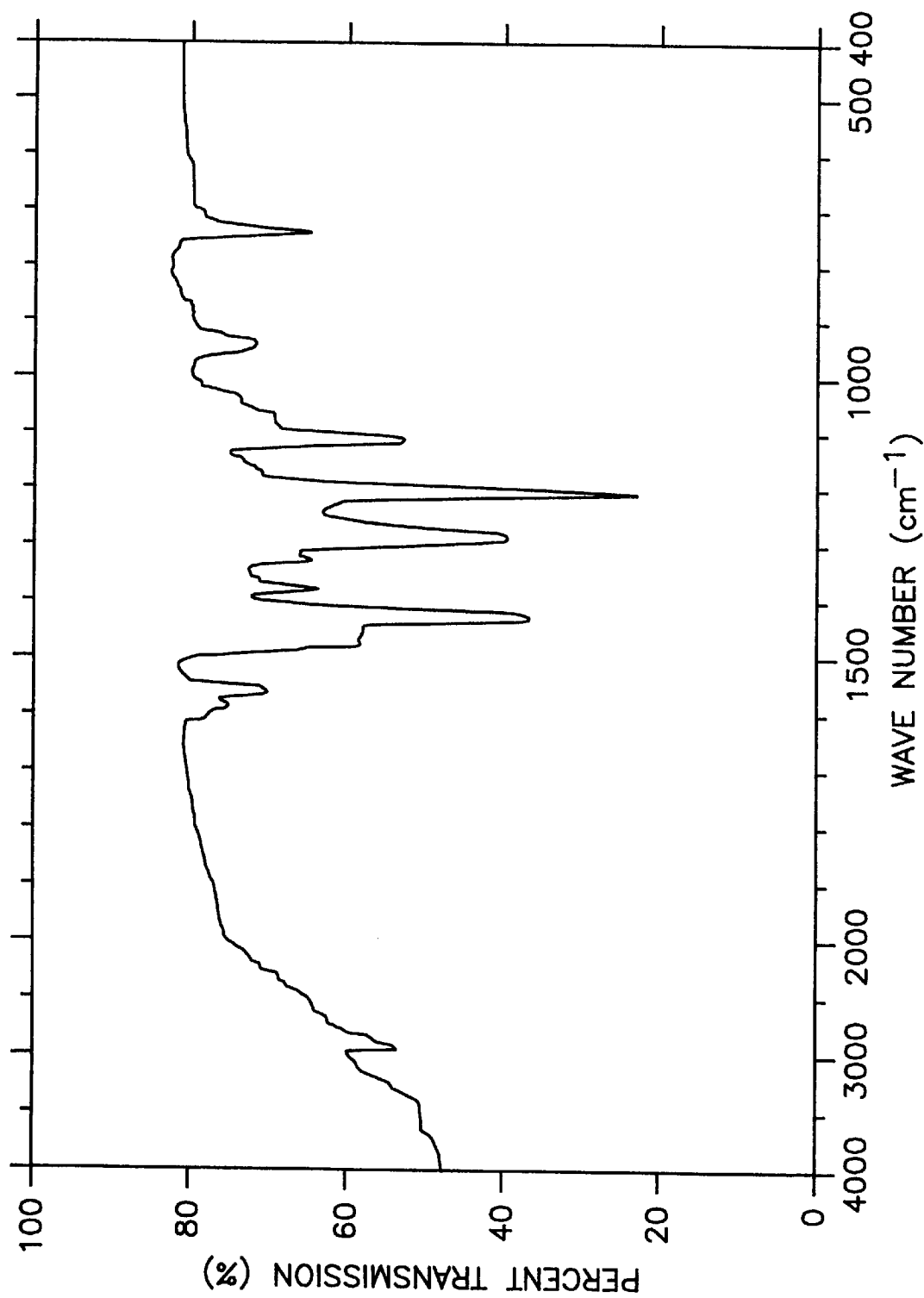
FIG. 7 shows an infrared absorption spectrum of phthalocyanine compound I-(32) as synthesized in Example 6.

The IR spectrum of the above compound is reproduced in FIG. 7.

Elemental analysis (for $C_{76}H_{64}Cl_4CuN_{12}O_4S_4$): 1543.02 M.W.

|              | C      | H     | N     |
|--------------|--------|-------|-------|
| Calcd. (%):  | 59.16; | 4.18; | 10.89 |
| Found (%):   | 59.13; | 4.16; | 10.93 |

MS (m/e): 1543 (M$^+$)

Figure 8:
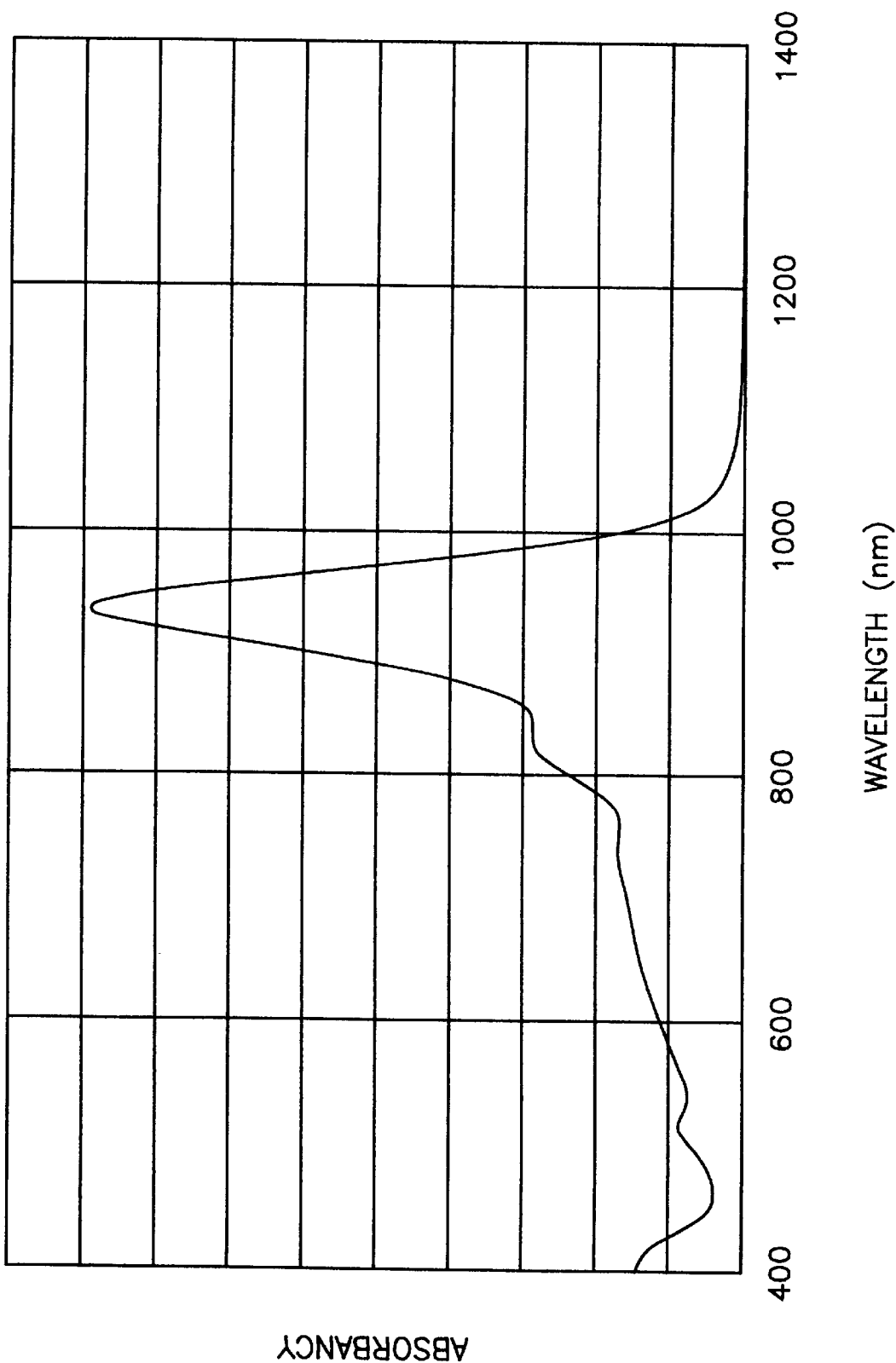
FIG. 8 shows an absorption spectrum of the phthalocyanine compound I-(32) synthesized in Example 6 as measured in toluene.

The toluenic solution of the compound thus obtained showed an absorption maximum at 938 nm with a gram absorption coefficient of $8.23 \times 10^4$ ml/g·cm. This absorption spectrum is shown in FIG. 8.

Comparative Example 2

Production of a phthalocyanine compound [the compound disclosed in Kokai Tokkyo Koho H8-176101]

A mixture of 4-(2-aminophenylthio)-5-chloro-3,6-diisopentoxyphthalonitrile (12.6 g), copper(I) chloride (1.2 g), DBU (7.8 g) and n-pentyl alcohol (78 mL) was refluxed with stirring for 48 hours. After cooling, the reaction mixture was withdrawn into 500 mL of methanol and the precipitate was collected by filtration and dried to recover 7.3 g of a crude product as black powders. This crude product was purified by column chromatography (silica gel/toluene) to provide 3.2 g of a pure product as black powders.

The toluenic solution of the compound thus obtained showed an absorption maximum at 896 nm with a gram absorption coefficient of $2.71 \times 10^4$ ml/g·cm.

Example 7

Production of a phthalocyanine compound [Compound I-(34)]

A mixture of 2-n-butoxyethanol (15 mL) and DBU (0.75 g) was heated to 145–155° C. and 4.75 g of the 5-(2-aminophenylthio)-6-chloro-1,3-diimino-4,7-diisopentoxyisoindoline obtained in Example 1 and 0.3 g of zinc chloride were added. The mixture was stirred at 155–160° C. for 8 hours and then worked up as in Example 5 to give 3.3 g of dark blue powders. This powdery product was purified by column chromatography [activated alumina/toluene:methanol (50:1)] to provide 1.8 g of a pure product as dark blue powders. The product was identified to be the objective compound by the following analyses.

Figure 9:
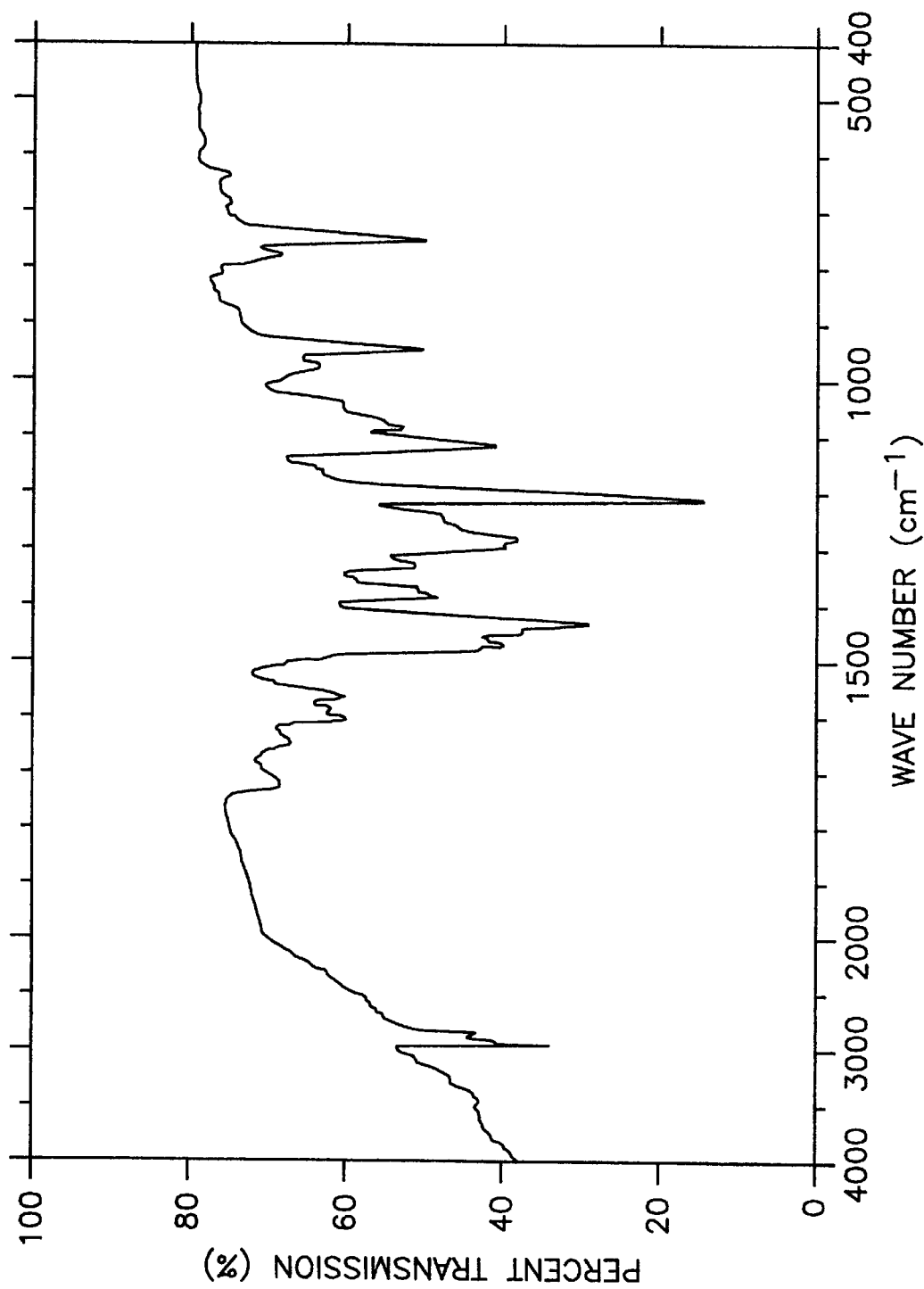
FIG. 9 shows an infrared absorption spectrum of phthalocyanine compound I-(34) as synthesized in Example 7.

The IR spectrum of the compound thus obtained is reproduced in FIG. 9.

Elemental analysis (for $C_{76}H_{64}Cl_4ZnN_{12}O_4S_4$): 1544.85 M.W.

|              | C      | H     | C     |
|--------------|--------|-------|-------|
| Calcd. (%):  | 59.25; | 4.18; | 10.88 |
| Found (%):   | 59.20; | 4.16; | 10.86 |

MS (m/e): 1544 (M$^+$)

Figure 10:
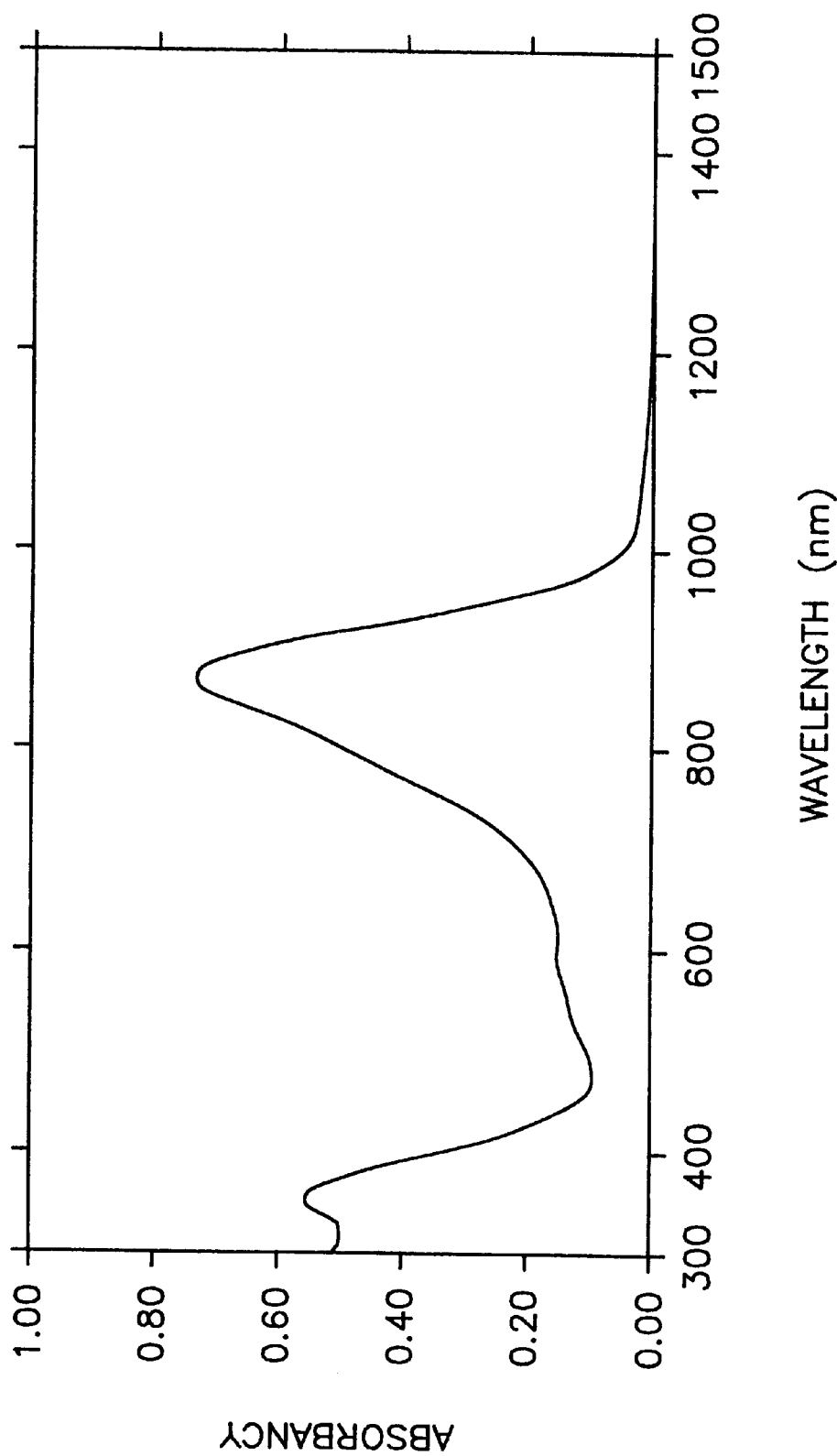
FIG. 10 shows an absorption spectrum of the phthalocyanine compound I-(34) synthesized in Example 7 as measured in toluene.

The toluenic solution of the above compound showed an absorption maximum at 873.5 nm with a gram absorption coefficient of $7.26 \times 10^4$ ml/g·cm. The absorption spectrum is shown in FIG. 10.

Example 8

Production of a phthalocyanine compound [Compound I-(112)]

A mixture of 2-n-butoxyethanol (15 mL) and DBU (0.61 g) was heated to 145–155° C. and 3.79 g of the 5-(2-aminophenylthio)-6-chloro-1,3-diimino-4,7-diisopentoxyisoindoline obtained in Example 1 and 0.4 g of manganese chloride were added. The mixture was stirred at 155–160° C. for 2 hours and then worked up as in Example 5 to give 2.8 g of dark blue powders. This product was purified by column chromatography [silica gel/toluene:methanol (50:1)] to provide 1.6 g of a pure product as dark blue powders. This product was identified to be the objective compound by the following analyses.

Elemental analysis (for $C_{76}H_{65}Cl_4MnN_{12}O_5S_4$): 1551.42 M.W.

|              | C      | H     | N     |
|--------------|--------|-------|-------|
| Calcd. (%):  | 58.84; | 4.22; | 10.83 |
| Found (%):   | 58.87; | 4.31; | 10.87 |

Figure 11:
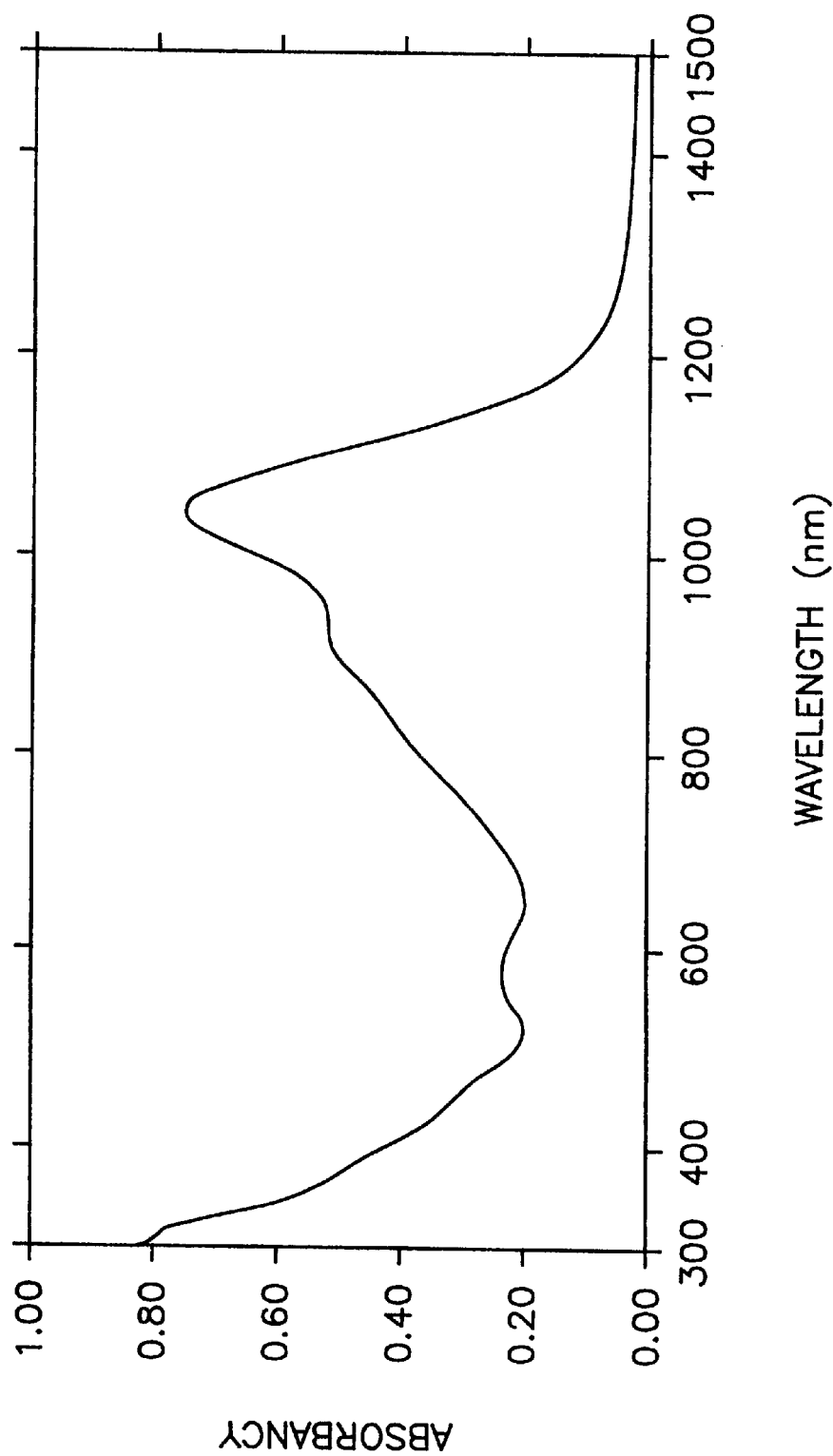
FIG. 11 shows an absorption spectrum of phthalocyanine compound I-(112) synthesized in Example 8 as measured in toluene.

The toluenic solution of the above compound showed an absorption maximum at 1047.0 nm with a gram absorption coefficient of $7.36 \times 10^4$ ml/g·cm. The absorption spectrum is shown in FIG. 11.

Example 9

Production of a phthalocyanine compound [Compound I-(137)]

A mixture of 2-n-butoxyethanol (15 mL) and DBU (0.76 g) was heated to 145–155° C. and 5.59 g of the 5-(2-aminophenylthio)-6-chloro-1,3-diimino-4,7-di-n-octyloxyisoindoline obtained in Example 2 and 0.3 g of nickel chloride were added. The mixture was stirred at 155–160° for 9 hours and then worked up as in Example 5 to give 3.8 g of dark blue powders. This product was purified by column chromatography [activated alumina/toluene] to provide 2.7 g of a pure product as dark blue powders. This product was identified to be the objective compound by the following analyses.

Figure 12:
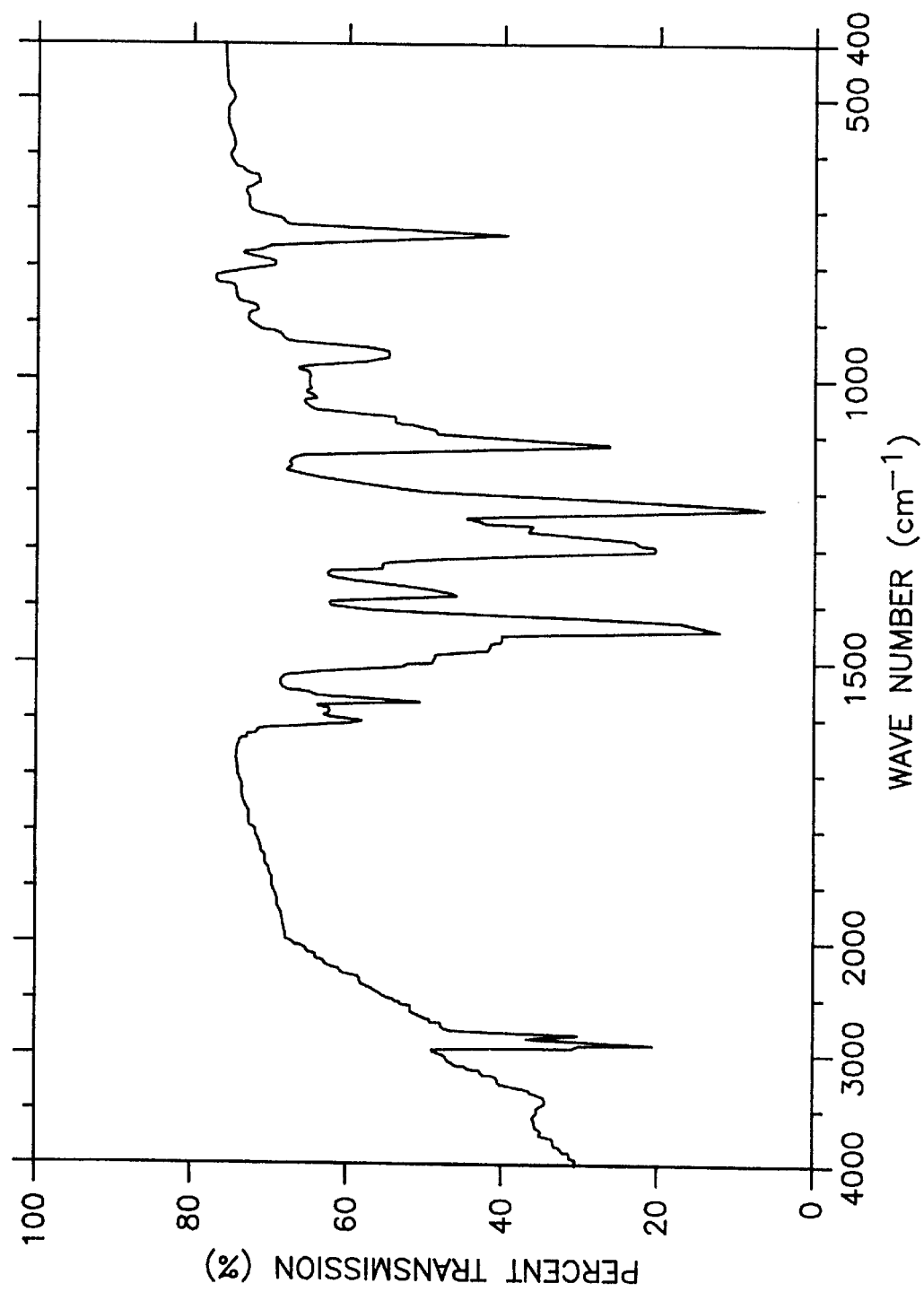
FIG. 12 shows an infrared absorption spectrum of phthalocyanine compound I-(137) as synthesized in Example 9.

The IR spectrum of the compound thus obtained is reproduced in FIG. 12.

Elemental analysis (for $C_{88}H_{88}Cl_4N_{12}NiO_4S_4$): 1706.49 M.W.

|  | C | H | N |
|---|---|---|---|
| Calcd. (%): | 61.94; | 5.20; | 9.85 |
| Found (%): | 62.12; | 5.24; | 9.80 |

MS (m/e): 1706 (M$^+$)

Figure 13:
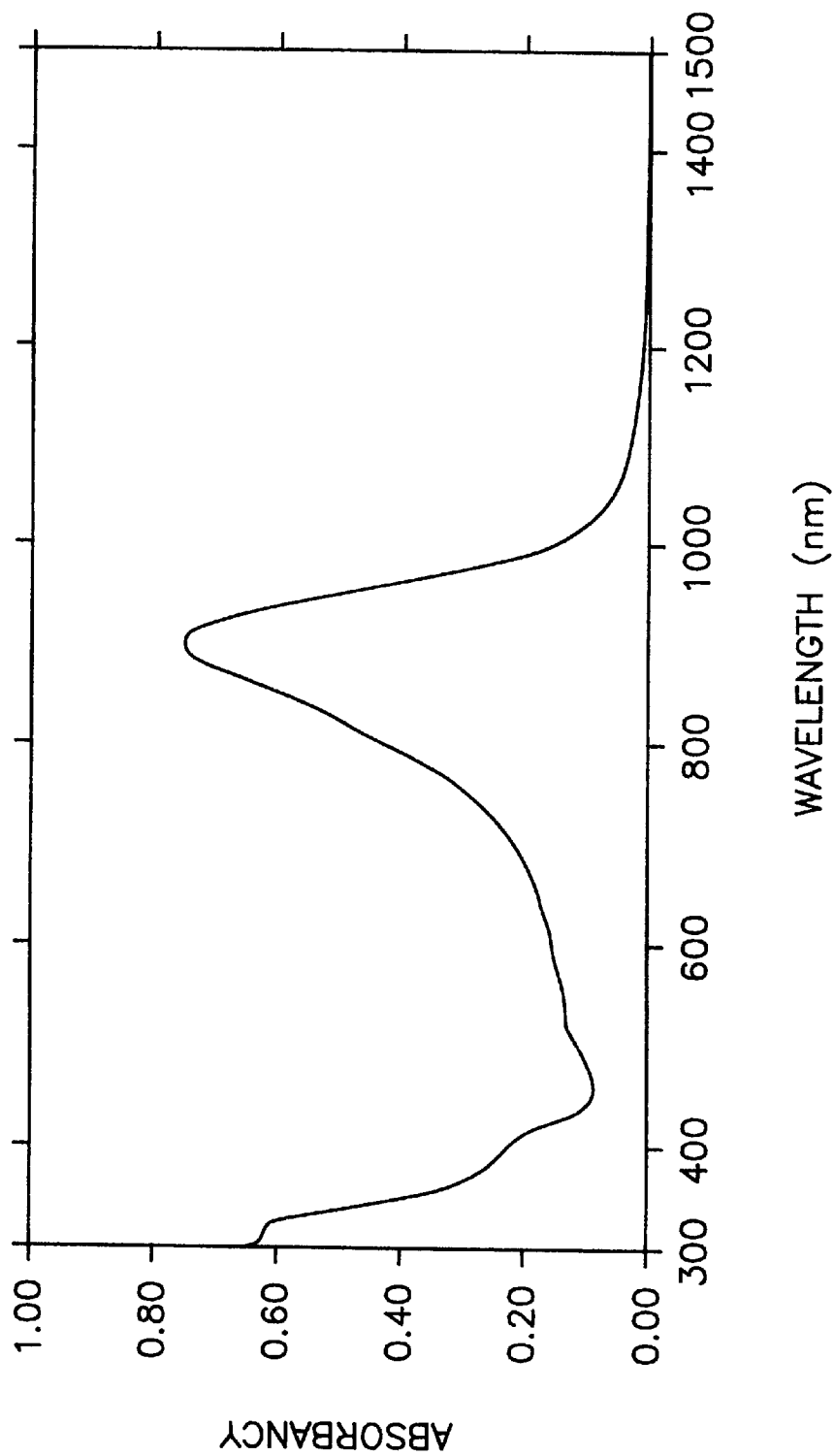
FIG. 13 shows an absorption spectrum of the phthalocyanine compound I-(137) synthesized in Example 9 as measured in toluene.

The toluenic solution of the above compound showed an absorption maximum at 900.5 nm with a gram absorption coefficient of 7.10×10$^4$ ml/g·cm. The absorption spectrum is shown in FIG. 13.

Example 10
Production of a phthalocyanine compound [Compound I-(152)]

A mixture of 2-n-butoxyethanol (15 mL) and DBU (0.76 g) was heated to 145–1.55° C. and 6.04 g of the 5-(2-aminophenylthio)-6-(4-tert-butylphonylthio)-1,3-diimino-4,7-diisopentoxyisoindoline obtained in Example 4 and 0.4 g of vanadium chloride were added. The mixture was stirred at 155–160° C. for 8 hours and then worked up as in Example 5 to give 4.7 g of dark green powders. This product was purified by column chromatography [silica gel/toluene:n-hexane (1:2)] to provide 3.1 g of a pure product as dark green powders. This product was identified to be the objective compound by the following analyses.

Figure 14:
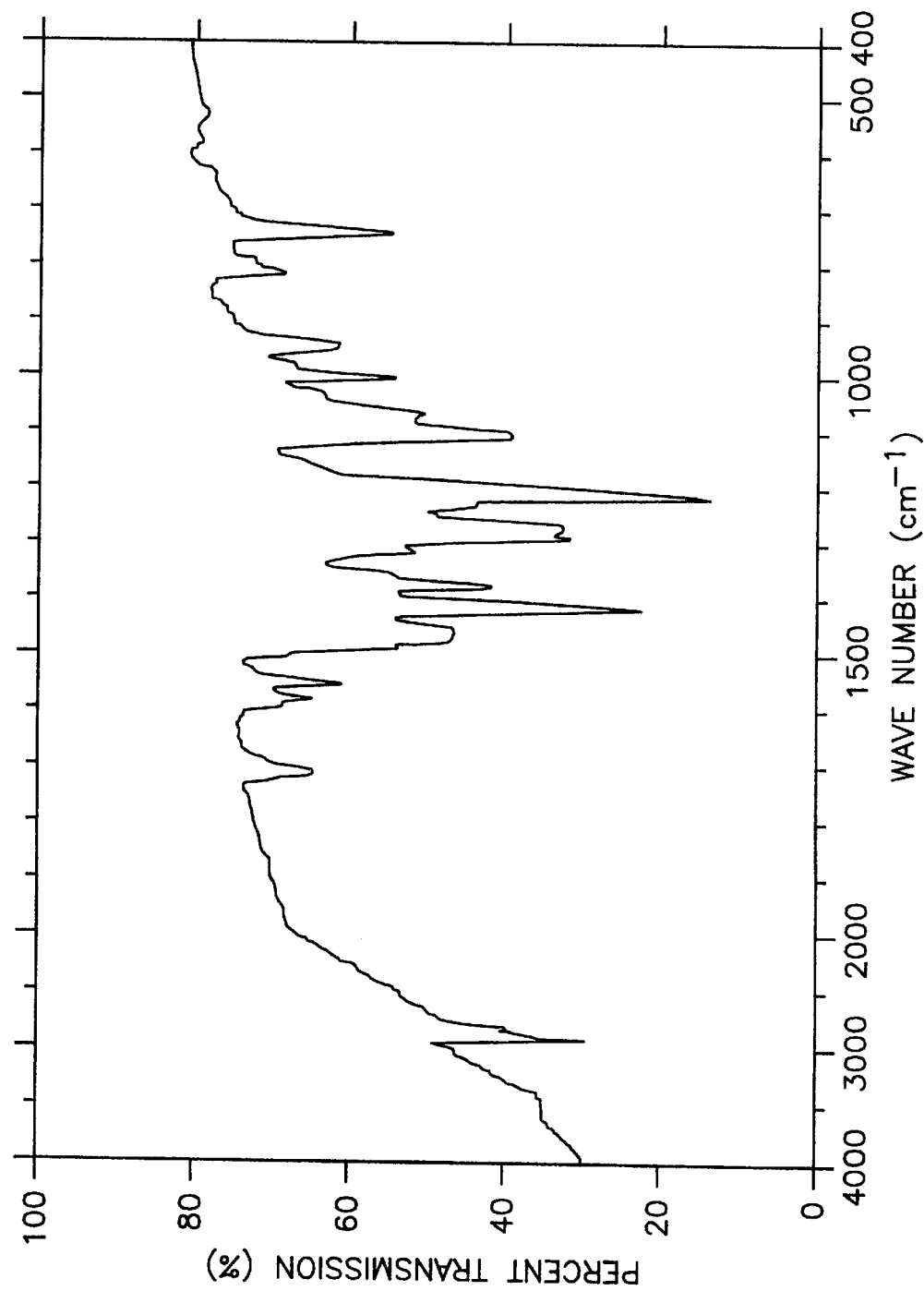
FIG. 14 shows an infrared absorption spectrum of phthalocyanine compound I-(152) as synthesized in Example 10.

The IR spectrum of the compound thus obtained is reproduced in FIG. 14.

Elemental analysis (for $C_{126}H_{116}N_{12}O_5S_8V$) 2065.69 M.W.

|  | C | H | N |
|---|---|---|---|
| Calcd. (%): | 67.45; | 5.66; | 8.14 |
| Found (%): | 67.50; | 5.68; | 8.18 |

MS (m/e): 2065 (M$^+$+1)

Figure 15:
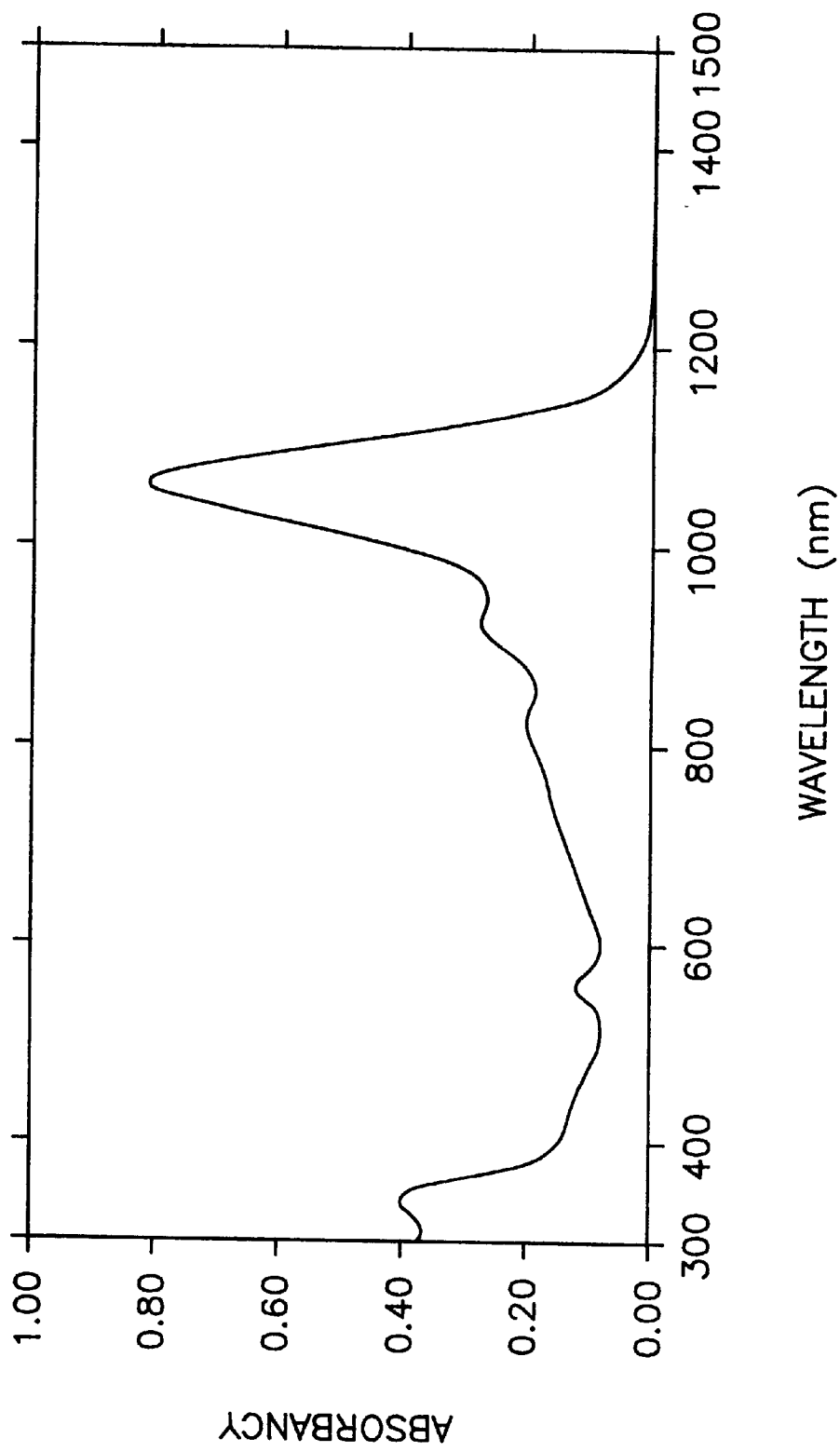
FIG. 15 shows an absorption spectrum of the phthalocyanine compound I-(152) synthesized in Example 10 as measured in toluene.

The toluenic solution of the above compound showed an absorption maximum at 1066.0 nm with a gram absorption coefficient of 8.02×10$^4$ ml/g·cm. The absorption spectrum is shown in FIG. 15.

Example 11
Production of a phthalocyanine compound [Compound I-(159)]

A mixture of 2-n-butoxyethanol (15 mL) and DBU (0.61 g) was heated to 145–155° C. and 4.47 g of the 5-(2-aminophenylthio)-6-chloro-1,3-diimino-4,7-di-n-octyloxyisoindoline obtained in Example 2 and 0.3 g of vanadium chloride were added. The mixture was stirred at 155–160° C. for 5 hours and then worked up as in Example 5 to give 3.1 g of dark green powders. This product was purified by column chromatography [silica gel/toluene:n-hexane (1:2)] to provide 1.6 g of a pure product as dark green powders. This product was identified to be the objective compound by the following analyses.

Figure 16:
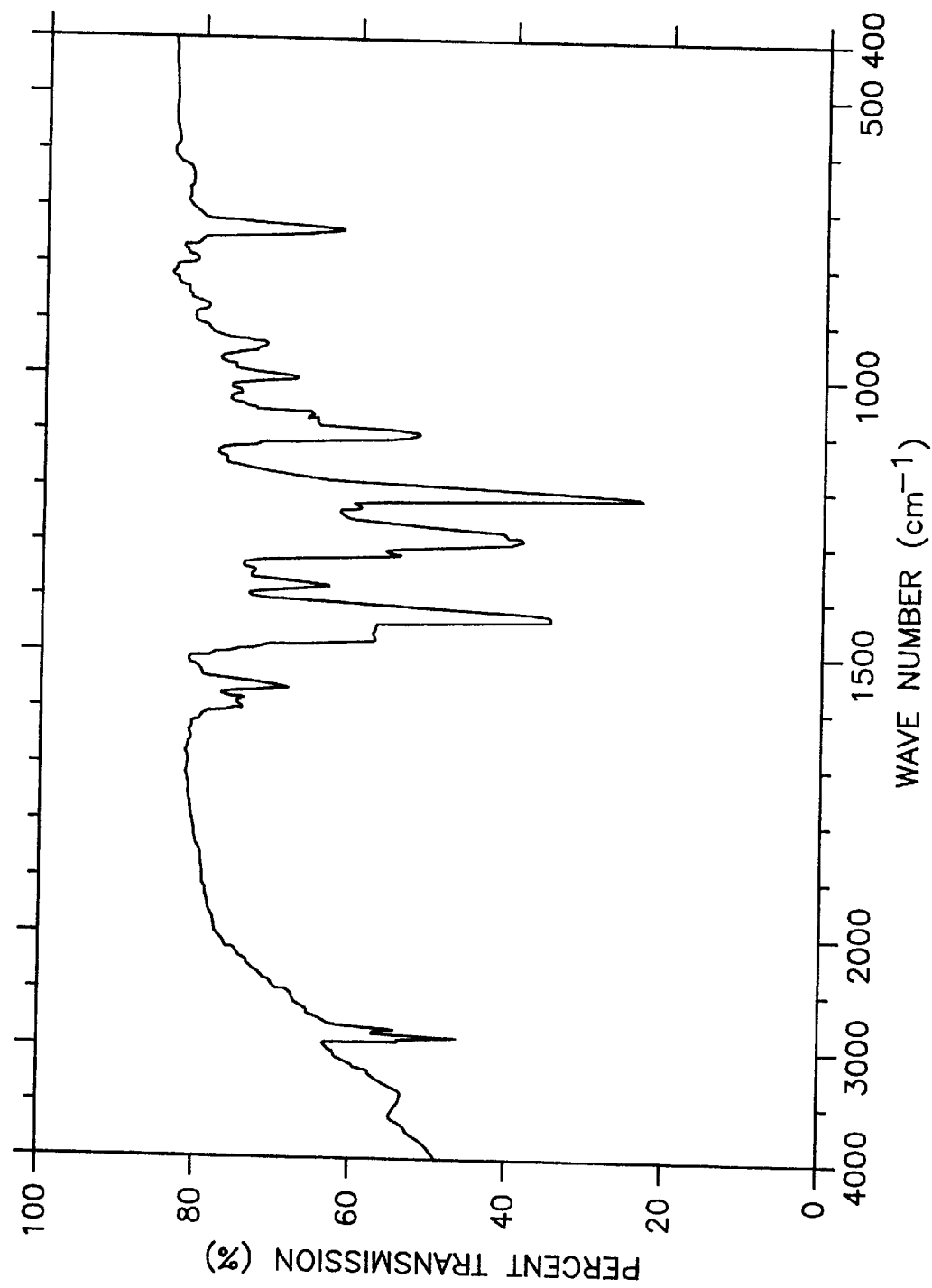
FIG. 16 shows an infrared absorption spectrum of phthalocyanine compound I-(159) as synthesized in Example 11.

The IR spectrum of the compound thus obtained is reproduced in FIG. 16.

Elemental analysis (for $C_{88}H_{88}Cl_4VN_{12}O_5S_4$): 1714.73 M.W.

|  | C | H | N |
|---|---|---|---|
| Calcd. (%): | 61.64; | 5.17; | 9.80 |
| Found (%): | 61.41; | 5.34; | 9.60 |

MS (m/e): 1712 (M$^+$)

Figure 17:
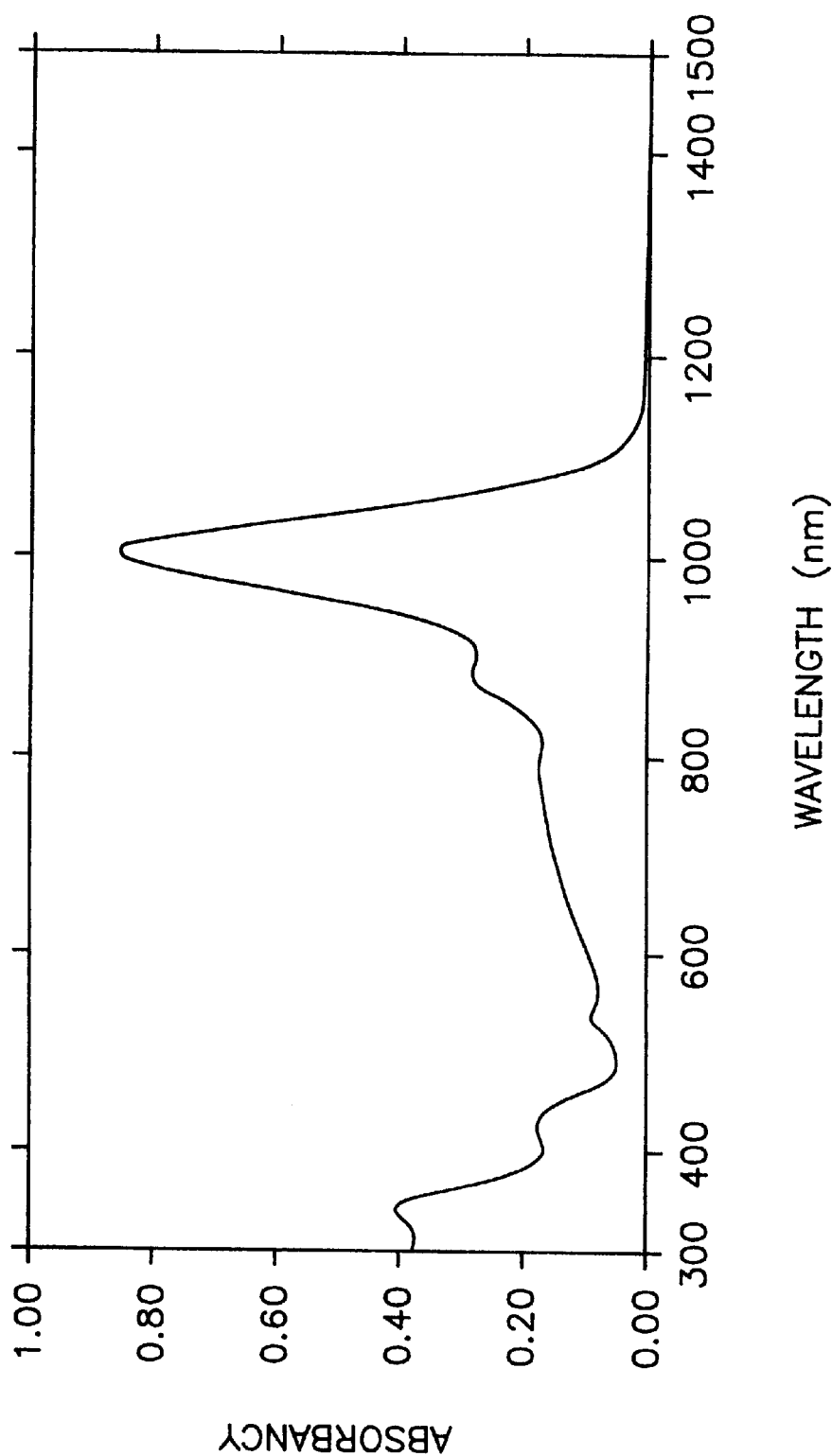
FIG. 17 shows an absorption spectrum of the phthalocyanine compound I-(159) synthesized in Example 11 as measured in toluene.

The toluenic solution of the above compound showed an absorption maximum at 1004.0 nm with a gram absorption coefficient of 8.20×10$^4$ ml/g·cm. The absorption spectrum is shown in FIG. 17.

Example 12
Production of a phthalocyanine compound [Compound I-(164)]

A mixture of 2-n-butoxyethanol (15 mL) and DBU (0.76 g) was heated to 145–155° C. and 7.18 g of the 5-(2-aminophenylthio)-6-chloro-1,3-diimino-4,7-di-(2-ethoxyethoxy)isoindoline obtained in Example 3 and 0.6 g of vanadium chloride were added. The mixture was stirred at 155–160° C. for 10 hours and then worked up as in Example 5 to give 5.1 g of dark green powders. This product was purified by column chromatography [activated alumina/toluene:acetone (100.1)] to provide 3.8 g of a pure product as dark green powders. This product was identified to be the objective compound by the following analyses.

Figure 18:
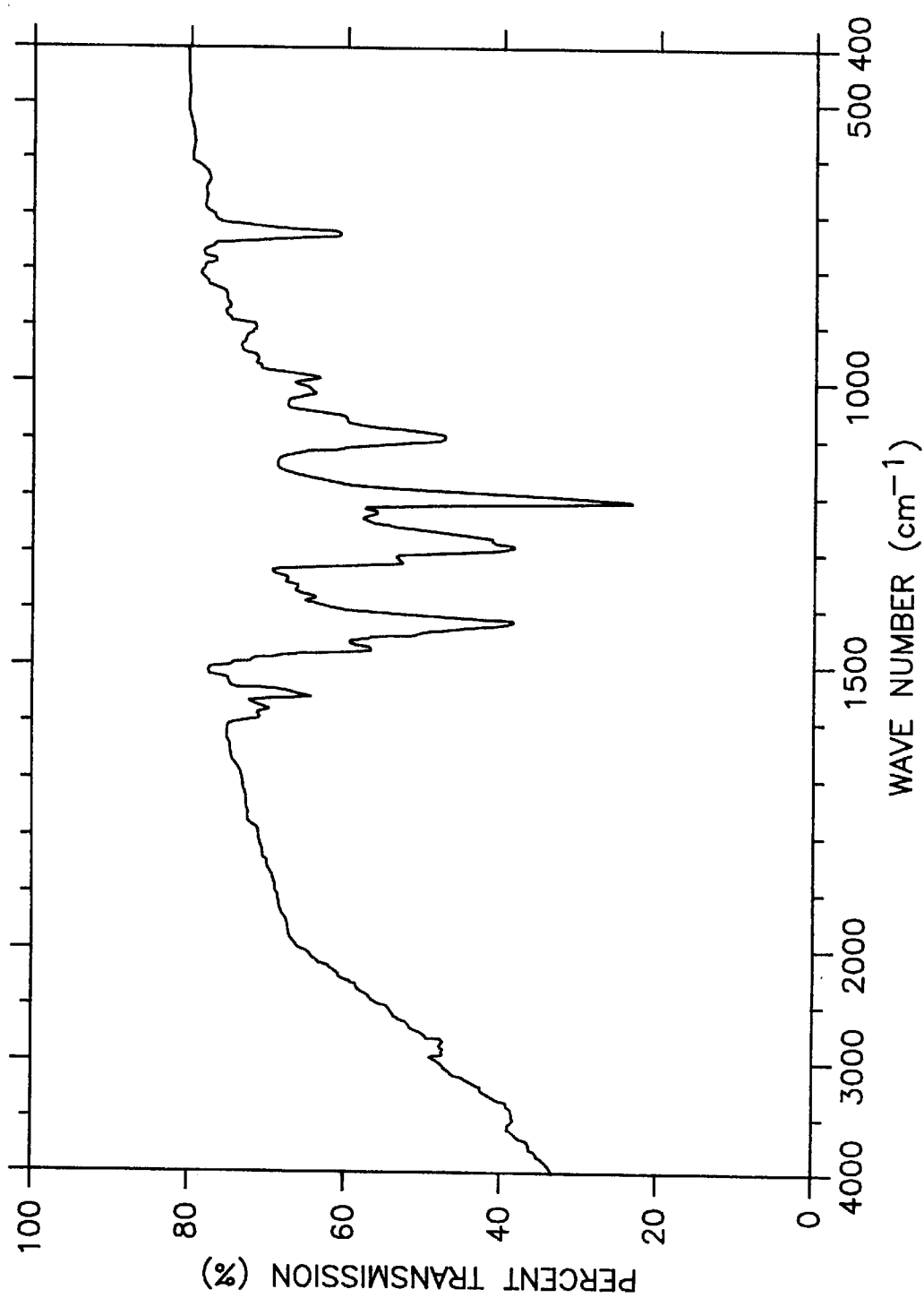
FIG. 18 shows an infrared absorption spectrum of phthalocyanine compound I-(164) as synthesized in Example 12.

The IR spectrum of the compound thus obtained is reproduced in FIG. 18.

Elemental analysis (for $C_{72}H_{56}Cl_4N_{12}O_9S_4V$): 1554.30 M.W.

|  | C | H | N |
|---|---|---|---|
| Calcd. (%): | 55.64; | 3.63; | 10.81 |
| Found (%): | 55.60; | 3.97; | 10.55 |

MS (m/e): 1552 (M$^+$+1)

Figure 19:
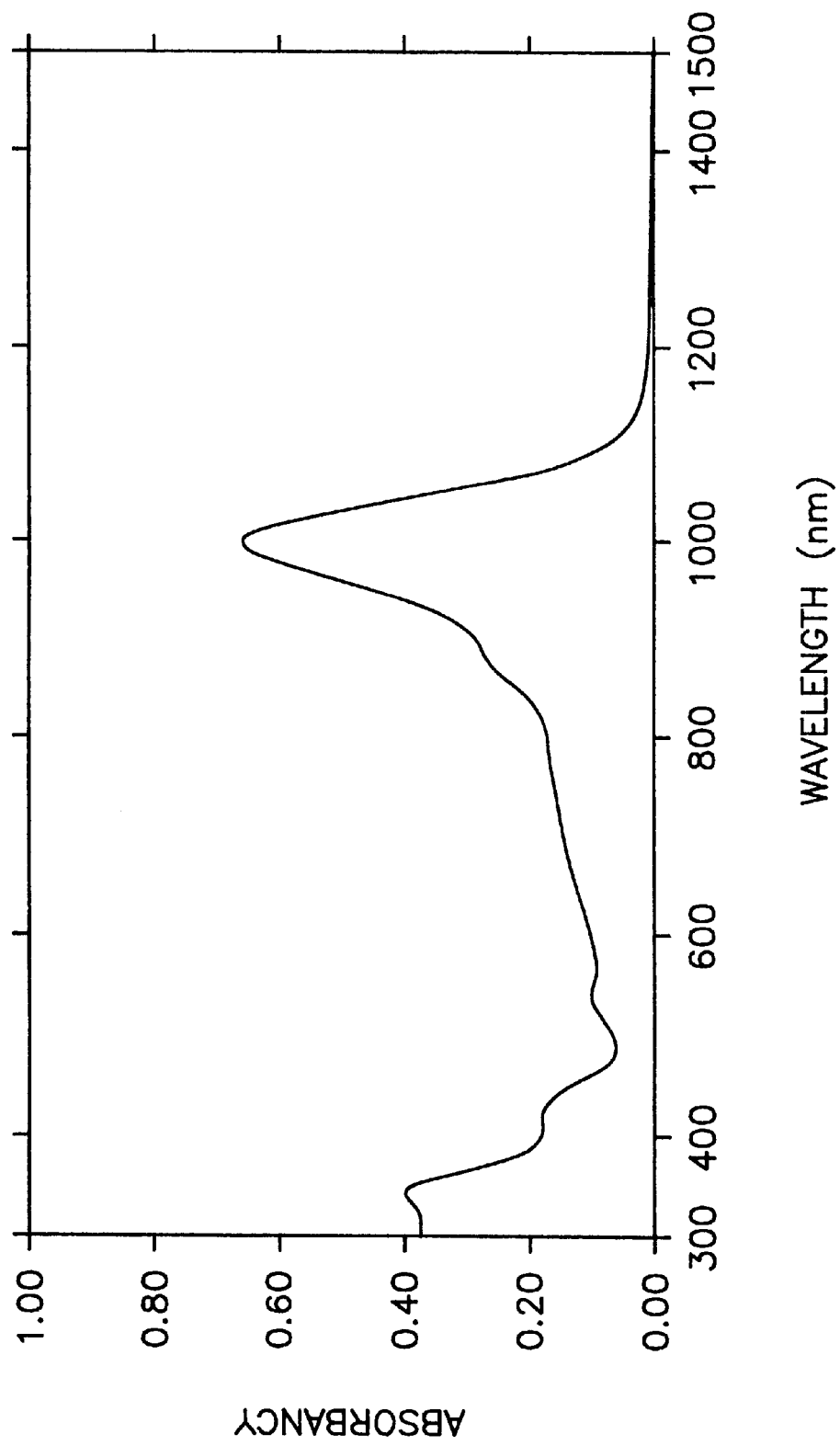
FIG. 19 shows an absorption spectrum of the phthalocyanine compound I-(164) synthesized in Example 12 as measured in toluene.

The toluenic solution of the above compound showed an absorption maximum at 998.0 nm with a gram absorption coefficient of 8.40×10$^4$ ml/g·cm. The absorption spectrum is shown in FIG. 19.

Example 13
Fabrication of a near infrared ray absorbing material

A homogeneous solution was prepared by mixing 24.4 g of 1,4-bis (α, α-dimethylisocyanatomethyl)benzene with 23.4 g of 1,3,5-tris(3-thiopropyl) isocyanate, 2 g of the phthalocyanine compound I-(31) synthesized in Example 5, and 0.06 g of dibutyltin dilaurate. This solution was cast in a flask consisting of a glass mold surface-treated with a fluorine-type external parting agent and a polyvinyl chloride gasket and heated at 70° C. for 4 hours, at 80° C. for 2 hours, and at 120° C. for 2 hours. After cooling, the molding was taken out. The resin article thus obtained was blackish brown and had a characteristic absorption band of 900–1100 nm, absorbing near infrared-light in this region well.

Example 14
Fabrication of a near infrared ray absorbing material

Using the phthalocyanine compound I-(32) synthesized in Example 6 in lieu of the phthalocyanine compound I-(31)

used in Example 13, the procedure of Example 13 was otherwise repeated to fabricate a near infrared ray absorbing material. The resin article obtained showed a characteristic absorption band of 800–1050 nm, thus absorbing near infrared light in this region well.

Example 15
Fabrication of a near infrared ray absorbing material

Using the phthalocyanine compound I-(34) synthesized in Example 7 in lieu of the phthalocyanine compound I-(31) used in Example 13, the procedure of Example 13 was otherwise repeated to fabricate a near infrared ray absorbing material. The resin article obtained showed a characteristic absorption band of 750–950 nm, thus absorbing near infrared light in this region well.

Example 16
Fabrication of a near infrared ray absorbing material

Using the phthalocyanine compound I-(112) synthesized in Example 8 in lieu of the phthalocyanine compound I-(31) used in Example 13, the procedure of Example 13 was otherwise repeated to fabricate a near infrared ray absorbing material. The resin article obtained showed a characteristic absorption band of 950–1200 nm, thus absorbing near infrared light in this region well.

Example 17
Fabrication of a near infrared ray absorbing material

Using the phthalocyanine compound I-(137) synthesized in Example 9 in lieu of the phthalocyanine compound I-(31) used in Example 13, the procedure of Example 13 was otherwise repeated to fabricate a near infrared ray absorbing material. The resin article obtained showed a characteristic absorption band of 800–1000 nm, thus absorbing near infrared light in this region well.

Example 18
Fabrication of a near infrared ray absorbing material

Using the phthalocyanine compound I-(152) synthesized in Example 10 in lieu of the phthalocyanine compound I-(31) used in Example 13, the procedure of Example 13 was otherwise repeated to fabricate a near infrared ray absorbing material. The resin article obtained showed a characteristic absorption band of 950–1200 nm, thus absorbing near infrared light in this region well.

Example 19
Fabrication of a near infrared ray absorbing material

Using the phthalocyanine compound I-(159) synthesized in Example 11 in lieu of the phthalocyanine compound I-(31) used in Example 13, the procedure of Example 13 was otherwise repeated to fabricate a near infrared ray absorbing material. The resin article obtained showed a characteristic absorption band of 900–1100 nm, thus absorbing near infrared light in this region well.

Example 20
Fabrication of a near infrared ray absorbing material

Using the phthalocyanine compound I-(164) synthesized in Example 12 in lieu of the phthalocyanine compound I-(31) used in Example 13, the procedure of Example 13 was otherwise repeated to fabricate a near infrared ray absorbing material. The resin article obtained showed a characteristic absorption band of 850–1000 nm, thus absorbing near infrared light in this region well.

Example 21
Fabrication of a near infrared ray absorbing filter

To 100 g of polystyrene was added 1 g of the phthalocyanine compound I-(31) synthesized in Example 5, and the mixture was melt-molded into a filter by the injection molding technique. This filter showed a very satisfactory transmission characteristic as well as high resistance to aging.

Examples 22–28
Fabrication of a near infrared ray absorbing filter

Using the phthalocyanine compounds synthesized in Examples 6–12, respectively, in lieu of the phthalocyanine compound I-(31) used in Example 21, the procedure of Example 21 was otherwise repeated to fabricate near infrared ray absorbing filters. All of the filters showed very satisfactory transmission characteristics as well as high resistance to aging.

Example 29
Fabrication of a light-heat conversion material

Using a poly(ethylene terephthalate) (PET) film with an average thickness of 5 $\mu$m as a support, a solution containing 10 g of DELPET 80 N (Asahi Chemical industry Co.; acrylic resin) and 0.1 g of the phthalocyanine compound I-(31) synthesized in Example 5 in 90 g of a 1:1 mixture of toluene and methyl ethyl ketone was cast in a dry film thickness of about 5 $\mu$m to prepare a sample.

A YAG laser (wavelength 1064 nm) and optics were arranged to focus the laser emission to a beam diameter of 10 $\mu$m on the surface of the sample. The YAG laser was adjusted so that the laser power reaching the target surface would be 180 mW and the sample was irradiated with single pulses at a pulse width of 20 $\mu$s. After irradiation, the sample was examined under the light microscope. As a result, the formation of through-holes with a diameter of about 10 $\mu$m was confirmed.

Example 30
Fabrication of a light-heat conversion material

Using the phthalocyanine compound I-(112) synthesized in Example 8 in lieu of the phthalocyanine compound I-(31) used in Example 29, the procedure of Example 29 was otherwise repeated to fabricate a light-heat conversion material. When tested in the same manner as above, this light-heat conversion material also showed satisfactory characteristics.

Example 31
Fabrication of a light-heat conversion material

Using the phthalocyanine compound I-(152) synthesized in Example 10 in lieu of the phthalocyanine compound I-(31) used in Example 29, the procedure of Example 29 was otherwise repeated to fabricate a light-heat conversion material. When tested in the same manner as above, this light-heat conversion material also showed satisfactory characteristics.

Example 32
Fabrication of a light-heat conversion material

Using the phthalocyanine compound I-(159) synthesized in Example 11 in lieu of the phthalocyanine compound I-(31) used in Example 29, the procedure of Example 29 was otherwise repeated to fabricate a light-heat conversion material. When tested in the same manner as above, this light-heat conversion material also showed satisfactory characteristics.

Example 33
Fabrication of a laser heat-sensitive recording material

Using a commercial heat-sensitive recording sheet (Fuji Photo Film Co.; Thermo Auto Chromo Paper A-20) as a support, a solution containing 10 g of DELPET 80N (Asahi Chemical Industry Co.; acrylic resin) and 0.1 g of the phthalocyanine compound I- (31) synthesized in Example 5 in 90 g of a 1:1 mixture of toluene and methyl ethyl ketone was cast in a dry film thickness of about 5 μm to prepare a sample.

A single-mode semiconductor laser (wavelength 980 nm) and optics were arranged to focus the laser emission to a beam diameter of 50 μm on the surface of the sample. The semiconductor laser was adjusted so that the laser power reaching the surface would be 35 mW and the sample was irradiated with single pulses at a pulse width of 30 ms. After irradiation, the sample was examined under the light microscope. As a result, the formation of black-brown spots with a diameter of about 50 μm could be confirmed.

Example 34
Fabrication of a laser heat-sensitive recording material

Using the phthalocyanine compound I-(112) synthesized in Example 8 in lieu of the phthalocyanine compound I-(31) used in Example 33, the procedure of Example 33 was otherwise repeated to fabricate a laser heat-sensitive recording material. When tested in the same manner as above, this sample also showed satisfactory characteristics.

Example 35
Fabrication of a laser heat-sensitive recording material

Using the phthalocyanine compound I-(152) synthesized in Example 10 in lieu of the phthalocyanine compound I-(31) used in Example 33, the procedure of Example 33 was otherwise repeated to fabricate a laser heat-sensitive recording material. When tested in the same manner as above, this sample also showed satisfactory characteristics.

Example 36
Fabrication of a laser heat-sensitive recording material

Using the phthalocyanine compound I-(159) synthesized in Example 11 in lieu of the phthalocyanine compound I-(31) used in Example 33, the procedure of Example 33 was otherwise repeated to fabricate a laser heat-sensitive recording material. When tested in the same manner as above, this sample also showed satisfactory characteristics.

EFFECT OF THE INVENTION

The novel phthalocyanine compound of the invention, which absorbs in the wavelength region of 800–1200 nm with a high absorption coefficient, is well soluble in organic solvents and compatible with various resins, and, in addition, has high resistance to aging. Therefore, it can be used with advantage in a variety of applications inclusive of near infrared ray absorbing materials and light-heat conversion materials.

What is claimed is:

1. A diiminoisoindoline compound of the following general formula (VI):

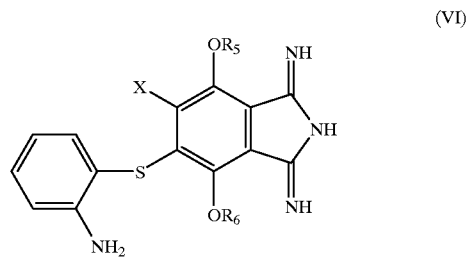

(VI)

wherein $R_5$ and $R_6$ each represents alkyl or alkoxyalkyl; X represents halogen, alkylthio, phenylthio which may be substituted, or naphthylthio which may be substituted.

2. A process for producing a diiminoisoindoline compound of general formula (VI) as claimed in claim 1 which comprises reacting a phthalonitrile compound of the following general formula (VII) with ammonia in the presence of a metal alkoxide.

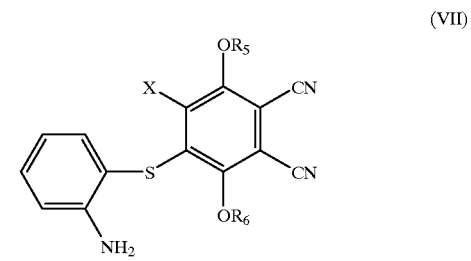

(VII)

wherein $R_5$ and $R_6$ each represents alkyl or alkoxyalkyl; X represents halogen, alkylthio, phenylthio which may be substituted, or naphthylthio which may be substituted.

3. The diiminoisoindoline compounds according to claim 1, wherein $R_5$ and $R_6$ each represent a $C_{1-12}$ straight-chain or branched alkyl group or a $C_{2-8}$ alkoxyalkyl group.

4. The diiminoisoindoline compound according to claim 1, wherein $R_5$ and $R_6$ each represent a $C_{1-8}$ straight-chain or branched alkyl group or a $C_{3-6}$ alkoxyalkyl group.

5. The diiminoisoindoline compound according to claim 1, wherein X represents halogen, alkylthio and optionally substituted phenylthio or an optionally substituted naphthylthio.

6. The diiminoisoindoline compound according to claim 1, wherein X is a $C_{1-12}$ alkylthio group.

7. The diiminoisoindoline compound according to claim 1, wherein X is a $C_{1-8}$ alkylthio group.

8. The diiminoisoindoline compound according to claim 1, wherein X is a phenylthio group, which is substituted by hydrogen, $C_{1-8}$ alkyl, $C_{1-8}$ alkoxy, amino substituted alkyl, or halogen.

9. The process for producing a diiminoisoindoline compound according to claim 2, wherein $R_5$ and $R_6$ each represent a $C_{1-12}$ straight-chain or branched alkyl group or a $C_{2-8}$ alkoxyalkyl group.

10. The process for producing a diiminoisoindoline compound according to claim 2, wherein $R_5$ and $R_6$ each represent a $C_{1-8}$ straight-chain or branched alkyl group or a $C_{3-6}$ alkoxyalkyl group.

11. The process for producing a diiminoisoindoline compound according to claim 2, wherein X represents halogen, alkylthio and optionally substituted phenylthio or an optionally substituted naphthylthio.

12. The process for producing a diiminoisoindoline compound according to claim 12, wherein X is a $C_{1-12}$ alkylthio group.

13. The process for producing a diiminoisoindoline compound according to claim 2, wherein X is a $C_{1-8}$ alkylthio group.

14. The process for producing a diiminoisoindoline compound according to claim 2, wherein X is a phenylthio group, which is substituted by hydrogen, $C_{1-8}$ alkyl, $C_{1-8}$ alkoxy, amino substituted alkyl, or halogen.

15. The process for producing a diiminoisoindoline compound according to claim 2, wherein the metal alkoxide is a sodium or potassium salt of methoxide, ethoxide, n-propoxide, n-butoxide, n-pentoxide, n-hexyloxide, n-heptyloxide, n-octyloxide, 2-methoxyethoxide, 2-ethoxyethoxide, or 2-n-butoxyethoxide.

16. The process for producing a diiminoisoindoline compound according to claim 2, wherein the metal alkoxide is present in an amount of 0.01–5 moles per mol of compound (VII).

17. The process for producing a diiminoisoindoline compound according to claim 2, wherein the metal alkoxide is present in an amount of 0.1–2.0 moles per mol of compound (VII).

* * * * *